(12) United States Patent
von Halle et al.

(10) Patent No.: US 8,073,801 B1
(45) Date of Patent: Dec. 6, 2011

(54) BUSINESS DECISION MODELING AND MANAGEMENT SYSTEM AND METHOD

(75) Inventors: Barbara von Halle, Mendham, NJ (US); Laurence Goldberg, Cary, NC (US)

(73) Assignee: The Decision Model Licensing, LLC, Mendham, NJ (US)

( * ) Notice: Subject to any disclaimer, the term of this patent is extended or adjusted under 35 U.S.C. 154(b) by 703 days.

(21) Appl. No.: 12/130,605

(22) Filed: May 30, 2008

(51) Int. Cl.
*G06E 3/00* (2006.01)
*G06F 15/18* (2006.01)
(52) U.S. Cl. ............. 706/47; 701/29; 717/110; 713/193
(58) Field of Classification Search .................. None
See application file for complete search history.

(56) References Cited

U.S. PATENT DOCUMENTS

| 2004/0194028 A1* | 9/2004 | O'Brien | 715/517 |
| 2005/0246302 A1* | 11/2005 | Lorenz et al. | 706/47 |

* cited by examiner

*Primary Examiner* — Kakali Chaki
*Assistant Examiner* — Kalpana Bharadwaj
(74) *Attorney, Agent, or Firm* — Craig A. Fieschko, Esq.; DeWitt Ross & Stevens S.C.

(57) ABSTRACT

A business decision modeling system graphically models business decisions using a rule family structure that adheres to Decision Model principles. In tabular representations, for example, two-dimensional rule families have a heading and a body. The heading includes one or more condition fact types and one conclusion fact type. The body includes unique logic statements corresponding with the heading's fact types, with operators and operands indicating how the logic operates on conditions to determine conclusions. All tested conditions fact types must be true for the conclusion fact type to be true. No two rule families can have the same conclusion fact type, and the conclusion fact type of a first rule family can be a condition fact type of a second rule family. Logic statements are atomic and cannot be further decomposed. The semantic and business integrity of the business rules ensure high quality logic traceable to business objectives.

25 Claims, 19 Drawing Sheets

| Rule Class Id* | Rule Class Name | Rule Class Description | Dominant Rule Classification | Estimated Volume of Terms | Estimated Volume of Rules | Rule Class Complexity | Priority |
|---|---|---|---|---|---|---|---|
| 8 | High Frequency Miscellaneous | These are rules for procedure codes that are frequently reviewed but don't fall into other categories. They include Prepay. | Inferred Knowledge | 400 | 100 | Medium | 99 |
| Total | | | | 400 | 100 | | |

FIG. 3

| Rule Class ID | STEP 2: Document to Decision | STEP 2: Develop Decision Model | STEP 3: Collect Documentation | STEP 3: Populate Decision Model | STEP 4: Develop & Maintain Glossary | STEP 5: Rules Analysis | STEP 5: Approve Rules | Total Hours | FTE Months |
|---|---|---|---|---|---|---|---|---|---|
| 8 | 62.00 | 50.00 | 12.50 | 135.50 | 80.00 | 44.00 | 16.00 | 400.00 | 3.04 |
| 0 | - | - | - | - | - | - | - | - | - |
| 0 | - | - | - | - | - | - | - | - | - |
| 0 | - | - | - | - | - | - | - | - | - |
| 0 | - | - | - | - | - | - | - | - | - |
| SUBTOTAL | 62.00 | 50.00 | 12.50 | 135.50 | 80.00 | 44.00 | 16.00 | 400.00 | 3.04 |
| TOTAL | 62.00 | 50.00 | 12.50 | 135.50 | 80.00 | 44.00 | 16.00 | 400.00 | 3.04 |

FIG. 4

| Pattern | Conditions | | | | Conclusion | |
|---|---|---|---|---|---|---|
| | Policy Tier | | Policy Discount | | Policy Tier Within Bounds | |
| 1 | ≤ | 1 | | | is | No |
| 2 | ≤ | 1.5 | > | 10% | is | No |
| 2 | ≤ | 2 | > | 20% | is | No |
| 2 | ≤ | 2.6 | > | 22% | is | No |
| 2 | > | 1 | ≤ | 0% | is | Yes |
| 2 | > | 1.5 | ≤ | 20% | is | Yes |
| 2 | > | 2 | ≤ | 22 | is | Yes |
| 1 | > | 2.6 | | | is | Yes |

← 100

102

104

Heading: Conclusion Fact. Only one permitted

Row: A single logic statement, or Business Rule. This example reads: "Where (or if) Policy Tier is greater than 1 and Policy Discount less than or equal to 20%, then The Policy Tier is within bounds."

Cell: Term or Value qualifying the Fact of the Heading

Heading: Condition Fact. 0 to many. No Underline of the Fact indicates the column values are known values or terms

Heading: Condition Facts. Underline indicates this is a dependent Rule Family

Rule Pattern: Numerical sequence assigned to each set of rows that share common headers Each column has a sub-column containing the operator that applies to the adjacent cell

FIG. 9

BUSINESS DECISION MODELING AND MANAGEMENT SYSTEM AND METHOD

FIELD OF THE INVENTION

The present invention relates generally to business systems and methods and, more particularly to automated computer implemented systems and methods for identifying, organizing, modeling and managing business decisions.

BACKGROUND OF THE INVENTION

Since the inception of computer systems for business in the early 1950s (and even earlier, beginning with the advent of card sorting machines), there has been a constant expansion of the functionality of automated and computerized business systems and of the central role played by these systems in the business organization. Today, a large size organization, for example, one to be found in the "Fortune 500" list of public corporations, is likely to have many different computer systems and platforms, using a wide range of operating systems, and even a wider range of programming languages. The total number of computer application systems used in these organizations can number in the thousands, and the majority of these application systems will need to exchange information with each other, many of them in "real time". Even the large applications in these environments, the so-called "mission critical" applications upon which the organization is dependent for on-going daily operation, can number in the hundreds, and may need to exchange huge amounts of data on a daily basis with each other and with many computer systems that may be external to the organization.

In the beginning, computer systems comprised single units of code, or programs, that provided all the aspects of the application system, including reporting, data transaction processing, user interface, workflow and business rules (program logic). As these programs were connected together to form systems the levels of complexity became compounded. Methods, tools, and evolving theory have been required to deal with this ever increasing complexity. Two of the strategies that have been used to combat this ever increasing complexity, and which are relevant to the present invention, are known as "separation of concerns" and "visualization".

Separation of concerns is based on the assumption that, within any given system, different parts of the system would handle different aspects of the system, such as reporting, data management, transaction processing, user interface, business rules and business logic, etc. In this way it is possible for one aspect of the system to be changed without affecting the rest of the system.

The separation of concerns led over time to the development of systems that had multiple "tiers" (these are called "n-tier" systems) or layers, where each tier would be responsible for a different aspect of the system. A typical n-tier system would consist of a tier responsible for the user interface (and other "presentation" type interfaces), a tier responsible for system workflow, a tier responsible for application logic, business rules and business logic, and a tier responsible for data. The tiers would be connected one to another by various messaging systems using standardized message formats, and so each tier could be developed and changed independently from the other tiers.

Evolving from this theory of separation of concerns came the idea to split the business rules, or business logic, from the rest of the program code, program the business rules into separate, discrete packages of business rule code, and execute that code on "Business Rule Engines". These engines were purpose built computer systems optimized to execute the business rules. In many architectures the business rules and their business logic were separated into their own tier in the n-tier architecture.

There are good reasons why business rules are excellent candidates for separation from other aspects of the program code and possibly placed into a separate tier of the architecture. Business rules tend to change more frequently than the rest of the program, because of changes in business condition and/or regulations. Also, changes in business rules are either totally at the discretion of the business (i.e., how the business wishes to handle certain business situations) or are required in order to be compliant with mandatory regulations. When business rules are integrated into the programs, finding and isolating specific rules within the code that are required to be changed to reflect a particular business or regulatory change is extremely difficult, as the program logic may be very complex. The code for a single rule may be scattered, spread across multiple different sections of or places in the code, and may be duplicated in many different programs across a system. It may also be found in many different systems.

By separating the business rules, and storing them discretely in business rule engine software products, business analysts working with programmers could be given relatively simple access to them to insure that they accurately reflected the will of the business users. Over time these purpose built products became known as Business Rule Management Systems (BRMS). Exemplary commercial BRMS vendors and their BRMS products include: Fair Isaac Corporation (Blaze Advisor), ILOG (ILOG JRules), Microsoft Corporation (BizTalk Server), and Pegasystems (SmartBPM Suite).

The BRMS proved a successful and relatively popular solution to the challenge, particularly for organizations where business rules abound, and where they need to be changed often. Increasingly, since the mid 1990s, application development for large scale application has included a certain amount of business rule specific development.

While solving one set of problems, BRMS development has exposed another. The business rules actually in use in an organization are embedded in diverse documents, in legacy computer systems, in regulatory filings, in individual employee's memory, and in practices that have been established by habit among employees. Even business rules automated in BRMS software are in a form not easily recognizable by non-programmers. Asked to discover the business rules in an organization, analysts and the business users with whom they work are faced with an effort for which little support exists, whether in theory, in methodology, or in software tools. Frequently the process of discovering business rules in practice exposes business rules actually in use in the organization that management may consider the incorrect business rules for the business to be using. At other times opportunities may be seen to improve the business rules in use once they are properly understood. This leads to opportunities to use a business rules approach to support a business re-engineering initiative.

BRMS software products assume that the analysts know the business rules. However, the effort to gather the business rules may be greater than actually programming the BRMS with those business rules. Separating the business rules from the rest of the requirements of a business system has exposed the reality that the industry has done a poor job of fully understanding and exposing business logic for the purpose of implementation into systems. Similarly, investigations into business rules actually in practice in automated systems as well as in manually operated systems have revealed that many of the business rules being employed in practice are not those that management understood to be employed, or that management (whether for business policy or regulatory purposes) required to be employed. These problems, exposed by this focus on business rules, are not new, but have become clear in the very recent past.

What is desired, therefore, is a method and system for discovering and managing business rules, clearly separated from other business and system aspects. Such a system should provide management with a clear understanding of the business rules that are employed or are to be employed in business systems.

From early in the evolution of software systems, the notion of abstracting complex systems into visually represented diagrams has played an important role in simplifying the tasks of design. The early visualizations were nothing more than black and white diagrams on paper, sometimes depicting program flow, sometimes data flow, and often the modular structure of the system.

Over time, the relationship between modeling and visualization became clearer. Theories such as the "Relational Model of Large Data Sets" in 1970 led to the development of models of data that vendors were able to use to represent large and complex data structures in simple two dimensional diagrams that became universally understood ("data models") because of the ubiquity of the theory. As the sophistication of the software supporting the data models increased, it became possible to generate data models from the data structures, or create a database from the model. In more recent times models have become complex, computer stored and generated, with multiple views of representation and abstraction. So some aspects of an entire organization (for which there are modeling techniques) may be modeled and represented in an abstract, graphical representation.

The use of "visualization" to assist in dealing with the complexity of modern computer systems has given rise to the notion that whole systems can be designed, and then implemented into computer systems, by the creation of visual models. This concept is referred to as Model Driven Architecture (MDA), which is sponsored and supported by the OMG (Object Management Group), a major software industry standards consortium. Ultimately, the aim of MDA is that computer systems will be generated automatically from their model representations, without the need for programming.

The MDA, in the OMG approach, is delivered at three levels of abstraction: the Computation Independent Model ("CIM"), the Platform Independent Model ("PIM"), and the Platform Specific Model ("PSM").

The CIM uses an appropriate domain-specific language (that is to say, a language applicable to the type of business being modeled, i.e., the insurance industry, or the travel industry, or the glass manufacturing industry, and so on). This model is designed to be independent of whether the system is to be automated (i.e., digitized or computerized), and independent of any particular form of computer system or platform. The value of the CIM is that it is meant to be understood equally well by business people as well as technologists, providing these groups with a shared understanding of the requirements, and is meant to represent the business system from a purely business perspective.

The CIM provides the input to the PIM when the system is targeted to be computerized. This is where the abstraction level is made more meaningful to the technologists so that they can use these models to understand the technical requirements of the system. The PIM is meant to be used by the technical architects of the computerized solution.

The PSM is where the model is made specific to the type of computer platform in which the system is to be implemented, e.g., CORBA, .NET, the Web, etc. The PSM may use different domain specific languages, or a general purpose language like Java, C++, PHP, Python, etc. Automated tools generally perform this translation.

The BRMS, in providing for business rules, is at a PSM level. Each vendor has their specific syntax and approach for the expression and/or modeling of business rules. To date, little or no modeling exists for business rules at the CIM or even PIM levels.

Consistent with the theory of "separation of concerns", models in MDA are separated into architectural tiers. Of all the tiers, perhaps the greatest advance in the area of MDA is business process modeling. Using tools called "Business Process Management Suites" (BPMS), users are able to create a graphic depiction of a business process at increasing levels of detail, until the highest detail of process steps are achieved. These models are able to be established at the CIM level. Once the graphic representation at the CIM level is complete, the user is able to generate a resulting system at the PIM level, and, today, even at the PSM level. In some cases, the model so produced is theoretically capable of running a fully automated digitized system representing the CIM designed process. Examples of BPMS vendors and their products include: Pegasystems Inc. (SmartBPM Suite), Tibco Software (iProcess Suite), Appian Corporation (Appian Enterprise), and Metastorm Corporation (Metastorm BPM).

Notwithstanding the progress made in the area of graphic depiction of business processes, BPMS software tools suffer in general from the inability to separate business rules from the business processes that they model (i.e., creating a CIM, or even a PIM of the business rules), defeating the principal of "separation of concerns", and also are unable to provide the business users or management with an understanding of the business rules used in the system. In addition, while processes are modeled in these tools, the business rules that they do provide for in the processes are not truly modeled, they are generally simply textual statements. Thus, business users are in the same position as previously noted above, with no means to create a model of the business rules for visualization purposes.

The significant difference between the nature of business processes and business rules should be understood to clarify why the two aspects should be separated in distinct model and physical forms, and how they should be connected one to the other. Process is a sequential activity, by definition connecting one business task to another by actions or messages. Process is ideally modeled as a series of task nodules ("tasks") connected by sequence arrows. At a point in the process, a task may be invoked in which a business decision will need to be made. At that point a transition takes place between the sequential nature of the process and a declaratory nature of the logic that is executed to resolve the business decision, which is to say that one or more business rules are executed. These business rules need not be specified (or executed) sequentially, but in declaratory fashion. Once the business decision is made (i.e., all the business rules (or business logic) necessary to resolve that business decision has been executed), control is passed back to the process, and the next appropriate task is executed in the sequential flow. Thus, business rules need their own modeling paradigm and venue, and these need to be separate from the business process model. In current systems business rules merely are captured as text, or as requirements, or in a proprietary syntax.

What is desired, therefore, is a system and method in which business rules are captured in a visual CIM, separated from a process-modeled representation with clear connections to the process models.

SUMMARY OF THE INVENTION

The present invention provides an automated computer implemented system and method for business decision modeling and management. A business decision modeling and management system and method in accordance with the present invention enables business managers and decision makers, and others who may not have computer programming skills, to gather, express in normal business language, organize, analyze, model, visually represent, and manage business rules grouped into business decisions, which is the logical business grouping of business rules or business logic, with minimal assistance of technical staff.

The present invention provides a computer implemented repository of business rules organized into higher order groups called "business decisions". In accordance with the present invention the business decisions and their business rules in the repository may be represented in visually graphic abstraction, as well as in textual detail.

The present invention provides a system and method for the authoring and management by a business user of the business decisions and the business rules in the repository. The present invention allows those business decisions and their business rules to be analyzed for semantic and business integrity in the context of the business organization and its strategies, and enables those business decisions and business rules to be traced to the business objectives such that as those objectives change the business rules may be modified to be aligned with those changes. Furthermore, the present invention allows those business decisions and their business rules to be traced to those business systems, whether computerized or not, where those business rules are employed, so that as the business rules are changed in the repository they can be adjusted in the systems in which they are used.

The present invention provides a system and method to connect a decision model and its business rules to business process models, and enables the business rules to support business process systems and BPMS tools.

A system and method for business decision modeling and management in accordance with the present invention is based upon a theory of the organization of business rules, called the Decision Model, which organizes all business rules into structures called Business Decisions. Each Business Decision consists of the business rules that are used to determine the resolution of the Business Decision. In accordance with the Decision Model of the present invention, each business rule and each Business Decision complies with a series of principles. These principles ensure that the business rule is correctly structured, and that none of the business rules in the entire business system duplicates, contradicts, or conflicts with another business rule in the business system, and that each business rule appears in a single place, and one single place only, in its correct position within the business system. This formalism enables a system and method in accordance with the present invention to provide accurate visual models of the Business Decision and its business rules for ease of understanding, use, analysis and management.

A system and method in accordance with the present invention provides for the tracing of the Business Decision models and their business rules to models of the business processes and use cases. Use cases are narratives, which describe the interaction between a primary system actor—the initiator of the interaction—and the system itself, represented as a sequence of simple steps. Actors are something or someone which exists outside the system under study, and who (or which) take part in a sequence of activities in a dialogue with the system, to achieve some goal. Actors may be end users, other systems, or hardware devices. Each use case is a complete series of events, from the point of view of the actor, which those Business Decisions support, as well as the relevant business strategies. A system and method in accordance with the present invention permits a graphical representation of the connection among Business Decisions, business rules, business strategies and business systems. It also enables a business organization to identify the business decisions, business rules and the business processes that need to be adjusted when business conditions or business strategies change. A system and method in accordance with the present invention preferably additionally provides for the tracing of those Business Decisions and their business rules to the business systems and business computer systems in which those business decisions and business rules are implemented. Thus, any changes that are made to the Business Decision and their business rules may be made efficiently in the business systems and business computer systems.

The objects and advantages of the invention will appear more fully from the following detailed description of the preferred embodiment of the invention made in conjunction with the accompanying drawings.

BRIEF DESCRIPTION OF THE DRAWINGS

FIG. 3 is an exemplary user interface screen shot illustrating the first stage of an estimator input in an exemplary system and method for decision modeling in accordance with the present invention.

FIG. 4 is an exemplary user interface screen shot illustrating the second stage of an estimator input in an exemplary system and method for decision modeling in accordance with the present invention.

FIG. 9 is an exemplary rule family (in table view) in accordance with the present invention.

DETAILED DESCRIPTION OF THE INVENTION

Figure 1:
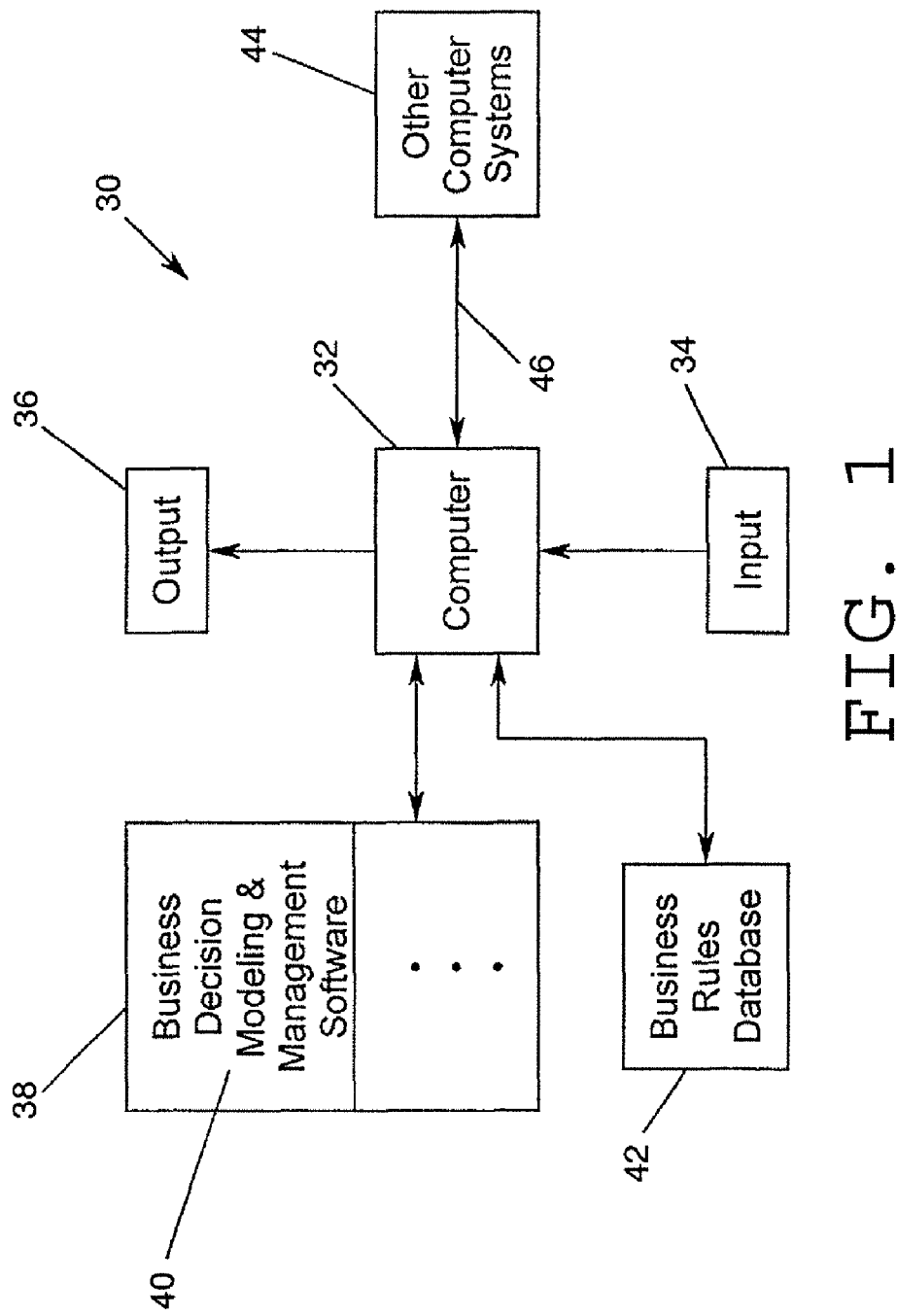
FIG. 1 is a schematic block diagram of an exemplary computer implemented system for decision modeling and management in accordance with the present invention.

The present invention will now be described in detail with reference to various examples and embodiments. Throughout this detailed description the invention will be described with reference to business decision modeling and management as related to conventional businesses and business operations. However, it should be understood that the present invention as embodied in its broadest concepts and applications may be applicable to decision modeling and management outside of conventional business applications, wherever there is a need or desire to make, model, and manage decision making.

A business decision modeling and management system and method in accordance with the present invention preferably is implemented for automatic or semi-automatic operation in a computer based system. An exemplary computer implemented system 30 in accordance with the present invention is illustrated in the schematic block diagram of FIG. 1. A system 30 in accordance with the present invention may be implemented on any conventional current or future general purpose computer 32 or other similar programmable device. The computer 32 may be implemented as a single desk top, lap top, handheld, or other computer, or may be implemented as multiple computers or similar devices coupled together, e.g., via appropriate network connections, to implement the functionality of business decision modeling and management in accordance with the present invention. The computer 32 may be provided with, or connected to, appropriate conventional input devices 34 (e.g., keyboard, mouse, track ball, light pen, etc.) and output devices 36 (e.g., monitor, printer, etc.) which allow a user of the system 30 to interact with the system functionality via appropriate user interfaces, e.g., via graphical user interfaces as described in more detail below. Conventional memory 38 (e.g., RAM, ROM, disk memory, etc.) may be provided to and/or accessible by the computer 32 in a conventional manner. Such memory 38 preferably contains computer program code instructions in the form of software 40 that provides for operation of the computer and the electrical signals therein to perform business decision modeling and management functions in accordance with the present invention. Memory 38 may also contain other software programs, such as computer operating system software, that may be necessary or desirable for general operation of the computer 32.

As will be discussed in more detail below, a system and method for business decision modeling and management in accordance with the present invention provides for the development, management, and use of business rules having specific useful characteristics. These decisions and business rules in accordance with the present invention may be stored in a decision base 42 that is coupled to the computer 32. The decision base 42 may be implemented in computer memory that is part of or separate from, the computer memory 38.

The computer 32 may preferably be coupled to one or more remote or local other computer systems 44 by any conventional current or future wired or wireless communication links or networks 46, such as the internet.

Based on the detailed written description, diagrams, and exemplary user interface displays described and presented herein, a person of ordinary skill in the art of computer programming for business decision applications will be able to implement the present invention on a computer based system, as described herein, using conventional programming languages and techniques for such applications.

A detailed description of the presentation begins with a presentation of some key definitions and concepts. For the purpose of the present invention, a "Business Decision" is understood to be a judgment, based upon business criteria, about a business concept, or about a business concept attribute, that the business is interested in managing. The following table illustrates by various examples the meanings of "concept", "attribute" and "Business Decision" as used herein:

| Business Concept | Attribute | Business Decision (Judgment) |
|---|---|---|
| Claim | Payment Eligibility | Determine whether we should pay this claim. |
| Claim | Payment Amount | Access the amount we should pay on this claim. |
| Policy | Renewal Method | Determine whether the renewal method of the policy is to be automatic or manual. |
| Inventory Item | Stock Level | Calculate the minimum stock level for this inventory item. |
| Loan | Prequalification | Determine whether this customer meets the prequalification requirements. |

Business rules are invoked in order to make the judgment called for in the business decision. The business rules thus contain the business logic that is needed by the decision. To resolve a single business decision, such as those in the table above, could, and usually does, require many business rules.

Business rules, for the purposes of the present invention, are transformations of a set of conditions into a single conclusion by a process of logical inference. An example of a business rule may be: "If the insurance policy is not within the policy tier between 2 and 4, then the insurance policy must be processed by the manual renewal method". In this business rule note the condition (insurance policy not within the policy tier between 2 and 4) that leads to the conclusion that the method of renewal must be manual.

Business rules may have multiple condition clauses. For example: "If the insurance policy has not been flagged with a manual review flag and the policy tier is between 2 and 4, then the policy must be processed by the automatic renewal method.

With reference to the examples just provided, additional business rules may prescribe other conditions that will require the insurance policy to be renewed by the manual renewal method, while other business rules may state what conditions may lead to the insurance policy being renewed by the automatic renewal method.

An exemplary preferred method 50 for business decision modeling and management in accordance with the present invention will now be described beginning with reference to FIG. 2. As discussed above, this preferred method 50 may be implemented in computer software 40 running on a computer system 32, as illustrated in FIG. 1, to realize a system 30 in accordance with the present invention. A system and method in accordance with the present invention preferably groups the following steps together as a single project, and tracks all activities for a specific project so that the progress and success of the project may be evaluated. All the decision model and business rule artifacts that are created and stored into the system may be maintained as a discrete catalog, or may be joined with other decision model and business rules such that, over time, the catalog can apply to a whole organization or a whole unit within an organization.

While the following steps are presented in an exemplary sequence, a process or method for business rule modeling and management in accordance with the present invention is not necessarily sequential. A system and method in accordance with the present invention thus preferably allows a user to go back and forth among the steps, in an iterative fashion, to build the entire decision model, and all of its business rules (all together referred to as a "Decision Base"), and its other artifacts. This capability may be provided by an appropriate graphical or other user interface that may be generated by the system 30 and displayed on the display output 36.

Figure 2:
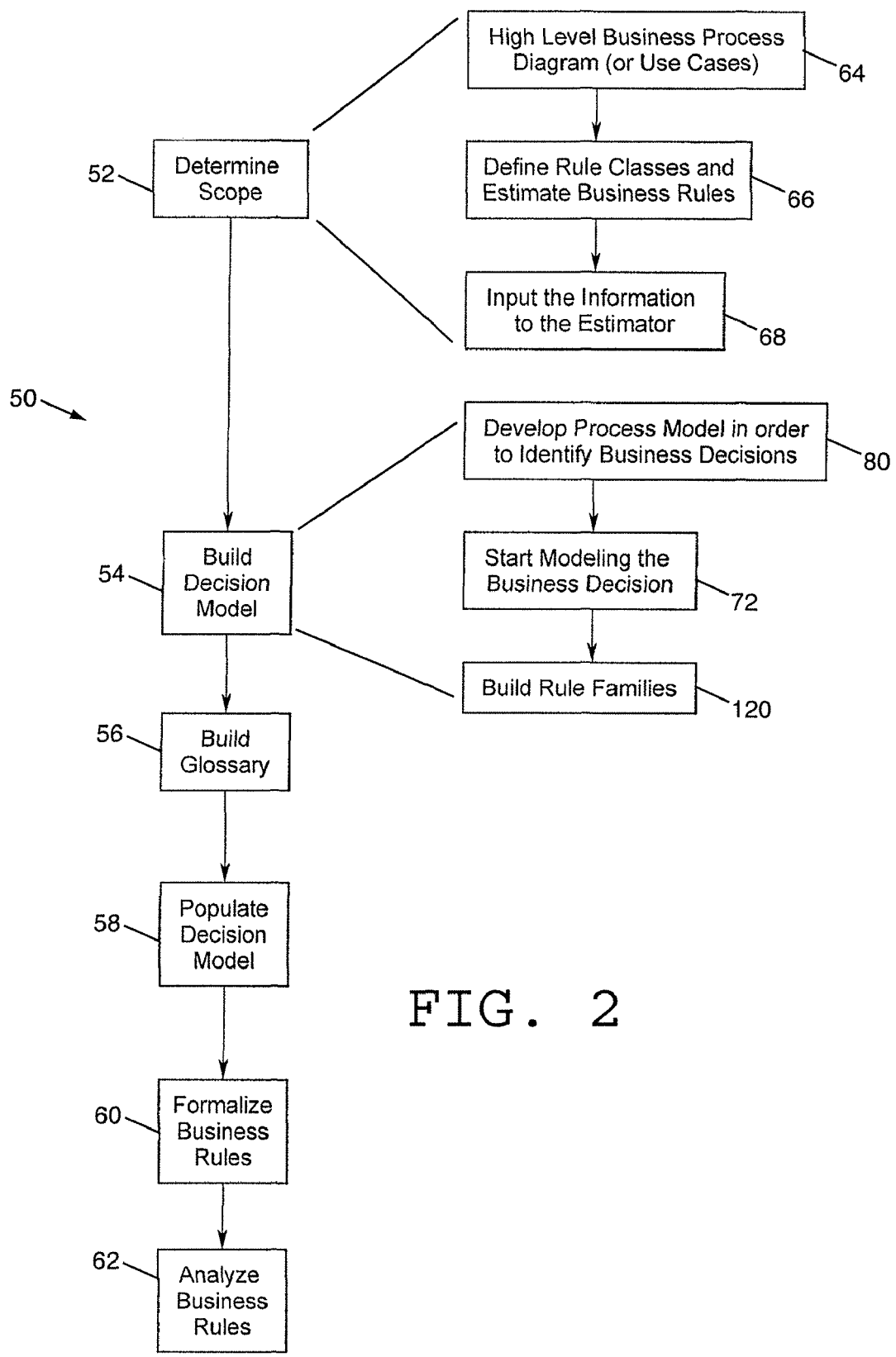
FIG. 2 is a flow chart diagram illustrating the major steps and selected sub tasks for each step of an exemplary method for business rule modeling in accordance with the present invention.

As illustrated in FIG. 2, six major steps of the exemplary method in accordance with the present invention to be described are as follows: determine scope 52, build decision model 54, build glossary 56, populate decision model 58, formalize business rules 60, and analyze business rules 62. As will be seen, each major step may include one or more sub tasks. Each of the steps and sub tasks will now be described in detail.

The first step in the process is to determine the scope 52 of the business rules to be modeled. In order to harvest successfully business rules, that is, to gather and translate real world business rules into the model, the scope of the business rules to be harvested in a specific project must be clearly established.

In accordance with the present invention, the system preferably may provide a graphical user interface that allows a user to draw (using a pointing device in a graphical drawing environment) a process diagram 64 that details the business process for which rules are to be harvested. This may be a process for an entire organization, or a set of sub-processes for a specific unit or function within an organization. This process diagram does not provide significant details, only an outline of all the tasks encompassed by the process. These tasks are defined as the scope and the process diagram incorporating the tasks are used as the starting point for the next step.

Alternatively, or additionally, a system and method in accordance with the present invention may provide for defining the scope of the rules by creating a list of use cases for the functions included in the business process for which the business rules are to be harvested. As in the case of the process models, no detail need be included in the use cases, other than listing the function for each use case that will be necessary for the business process of interest.

Once the major tasks or use cases have been identified, rule classes 66 are defined for each of these tasks or steps. A rule class is an artifact in the decision model that is used specifically to perform estimations in the scoping step. A rule class is a high-level grouping of business rules about one business concept and representing one specific pattern of logic processing about that business concept. For the purposes of this patent application, a business concept is defined as any distinguishable (or group of) person(s), place(s), thing(s), or events about which business rules are written.

The following table provides an exemplary listing of groupings or types of rule classes and specific examples of each:

| Rule Class Type | Goal of Rule Class Type |
|---|---|
| Validation | Aims to verify that input information about a business concept is correct, includes simple constraint rules. Examples:<br>a. Validate customer<br>b. Determine if ordered item is valid |
| Computation | Aims to carry out calculations about a business concept. Examples:<br>a. Compute total dollar amount for an order<br>b. Calculate total value of claim |
| Assessment/Eligibility | Aims to characterize a situation in terms of a fixed set of conclusions. Examples:<br>a. Determine risk of loan application<br>b. Determine if college applicant qualifies for financial aid |
| Assignment | Aims to create a mapping between two sets of business concepts (usually involving constraints first, preferences second). Examples:<br>a. Assign planes to gates<br>b. Assign agents to claims |
| Monitoring/Auditing | Aims to make decisions about ongoing process or behavior. Examples:<br>a. Check flight passenger behavior over 1 week<br>b. Check stock trader behavior over 30 days |

The system and method of the present invention preferably provides an estimator 68 that has inputs that include the rule class types in each process task (or use case, or rule class), and the user's assessment of the number and complexity of the rules within each decision. See FIG. 3. The estimator uses factors that have been built in, based upon past practice and experience, to project a total level of effort to complete the rules harvesting project. This estimate is given several dimensions, by full time equivalent for each role within the project, and for each step in the project. Based upon the number of participants in the project the estimator is able to provide a potential range of elapsed time to completion. See FIG. 4. The built in factors of the estimator can be updated, over time, with experiential changes to correct discrepancies between projected and actual level of effort.

Once the scope 52 has been established the next step is to build the decision model 54. This is accomplished by developing the process model 80 for the given scope to a greater degree of detail until all the tasks that contain business decisions, as defined above, have been identified. A system and method in accordance with the present invention preferably may provide graphical user interface tools that allow a user to designate or label the tasks on the process models (or steps within a use case) that contain business decisions with an appropriate flag or marker, e.g., a decision icon. In response to such designation a system and method in accordance with the present invention preferably automatically instantiates a business decision object named for that task, and creates a decision model diagram, linked to the process model step in which the decision icon was placed. A click of the pointing device 34 on the process model step as represented in the graphical user interface preferably results in a property page of the process model step to be displayed, in which a link to the business decision property page preferably is embedded. A click of the pointing device on the business decision icon within the process task preferably will take the user to the business decision diagram for that business decision.

Figure 5:
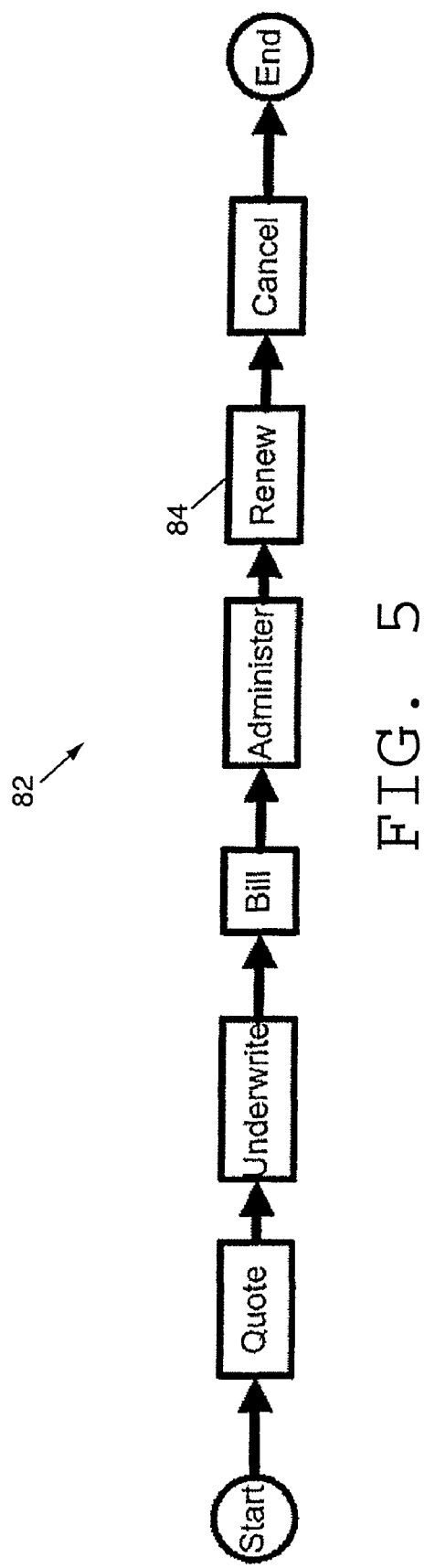
FIG. 5 illustrates a high level process model of an insurance enterprise as may be displayed on the graphical user interface of a system in accordance with the present invention.

For example, FIG. 5 illustrates a high level process model 82 of an insurance enterprise as may be displayed on the graphical user interface of a system in accordance with the present invention. Note that only the highest level processes are displayed as tasks. By pointing at one of the tasks, and clicking on the pointing device to select that task, the system will expand the sub-process model underlying. In the present example, let us assume that the task "Renew" 84 is selected in this manner.

Figure 6:
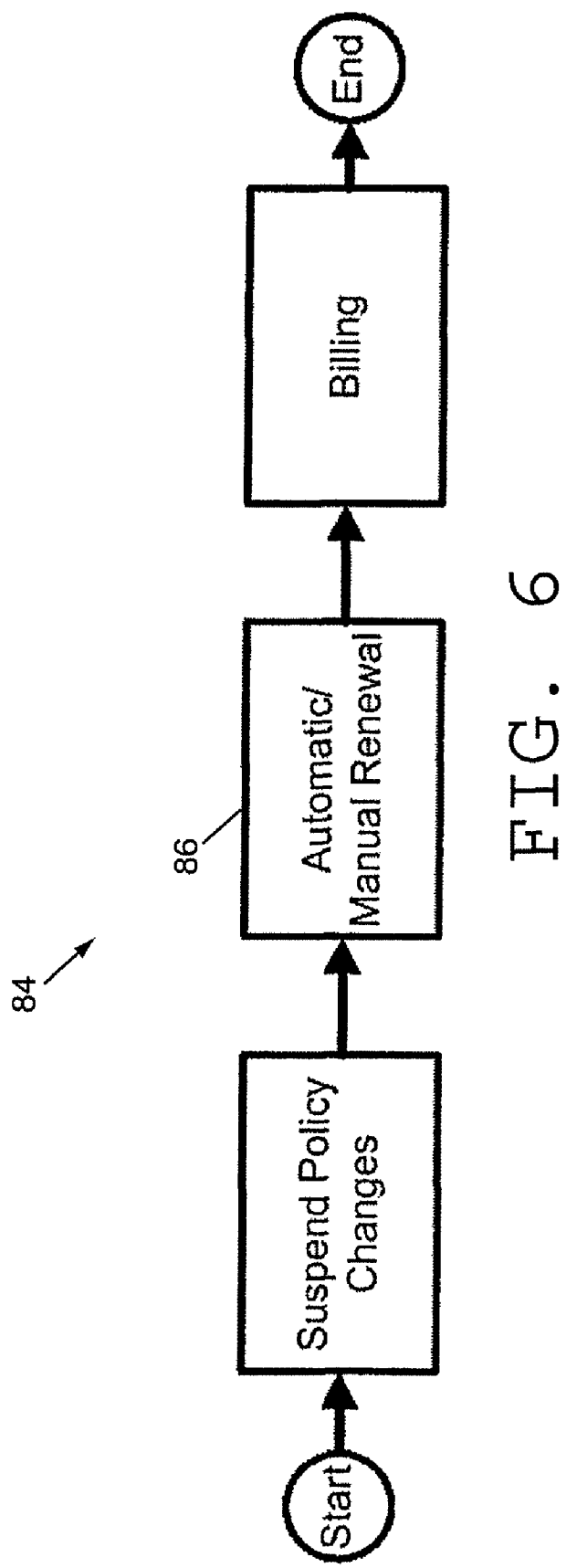
FIG. 6 illustrates an exemplary screen view in the graphical user interface of the tasks in the "Renew" sub-process of the high level process illustrated in FIG. 5.

FIG. 6 illustrates the resultant screen view in the graphical user interface of the business process illustrating the tasks in the "Renew" sub-process 84. Since there are still no business decisions in evidence, the user drills down to the next level by using the input device 34 to select a task at this level. Let us assume that the task called "Automatic/Manual Renewal" 86 is selected.

Figure 7:
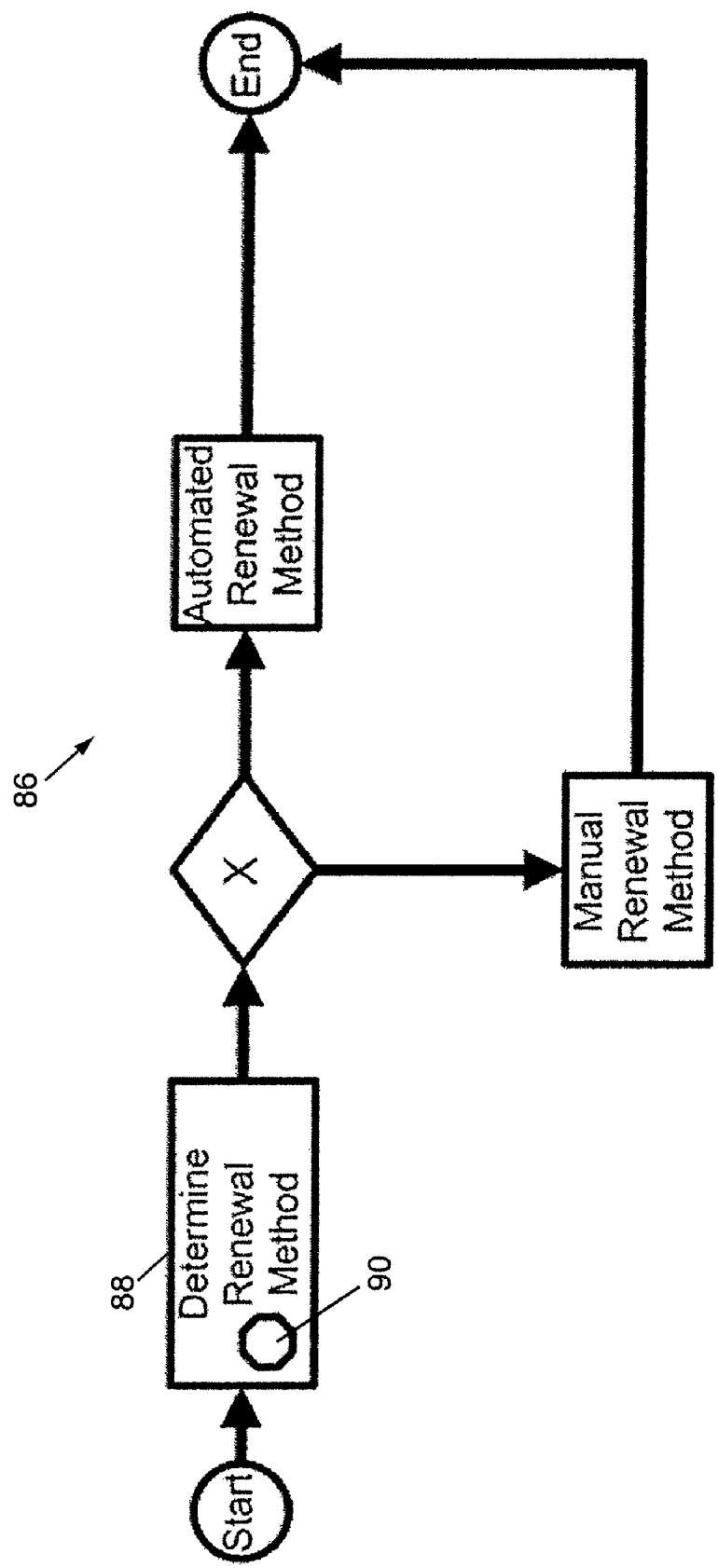
FIG. 7 illustrates an exemplary screen view in the graphical user interface of the sub-process "Automatic/Manual Renewal" of the sub-process illustrated in FIG. 6, showing one of the tasks of this sub-process marked as a business decision.

FIG. 7 illustrates the resultant screen view in the graphical user interface of the selected sub-process "Automatic/Manual Renewal" 86. This process includes a task titled "Determine Renewal Method" 88. Upon inspection, if it is determined that this task 88 constitutes a business decision, as defined above, the representation of the task is marked with a business decision icon 90 using the graphical user interface. (Note that the business decision icon 90 is illustrated as an octagon by example in the drawing figures of the present application, but may take any desired graphical form, size, shape, color, etc.) The rules for this business decision 88 now need to be discovered.

Figure 8:
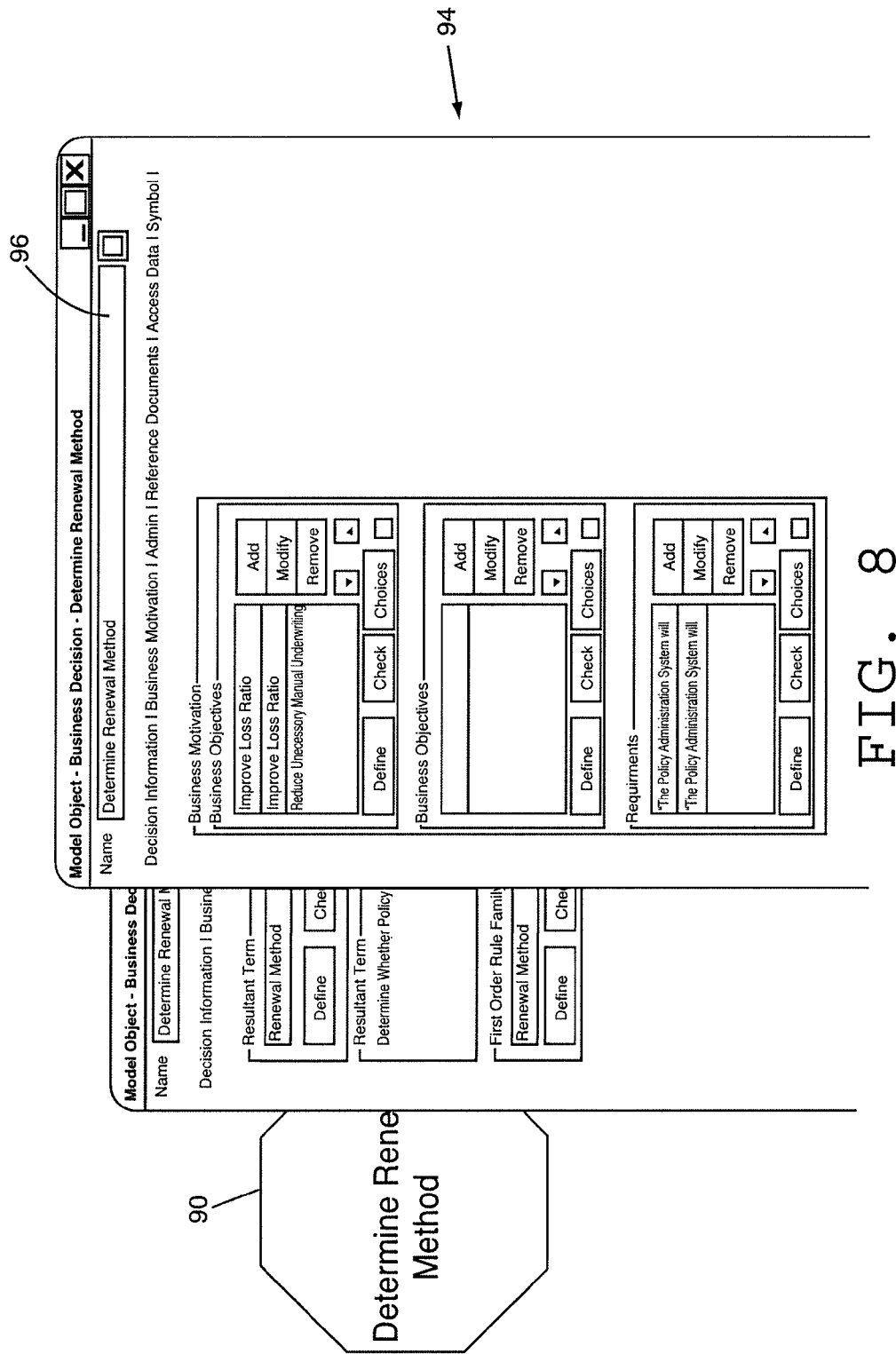
FIG. 8 shows an exemplary graphical user interface for modeling identified business decisions in accordance with the present invention.

With the business decisions identified 80, it is now time to start modeling 92 the identified business decisions. The business decision object has a decision symbol icon for use in the model view (e.g., the octagon 90 illustrated in FIG. 7) and a set of properties that are presented, preferably via an appropriate graphical user interface, to the user for completion. These properties may include, for example, the name of the business decision, and other information including which business objectives the business decision is connected with, and what business metrics need to be measured in order to establish the efficacy of the decision once it is in operation. An exemplary graphical user interface 94 for modeling identified business decisions in accordance with the present invention is illustrated FIG. 8.

Each identified business decision is assigned a name 96. By convention, the business decision name preferably begins with a decision word, such as "Determine", or "Calculate", or "Validate" or "Assess", that is followed by the business concept or business concept attribute that is the subject of the judgment or decision. For example, the name of the business decision may be "Determine if Renewal Method of Policy is Manual or Automatic".

Based upon the business decision name 96, a system and method in accordance with the present invention preferably creates a decision model diagram for that business decision. This diagram may preferably be implemented into a diagram space on the computer desktop. The decision model diagram at first consists only of the decision model symbol or icon, e.g., the octagon 90. This shape represents the whole model, and is the symbol to which are attached the properties of the business decision. The business decision is the artifact by which a connection to other models are created for business rules. By selecting the business decision symbol or icon 90, e.g., using the input device 34, property pages 96 of the business decision may be accessed and updated. The property pages 96 include metadata information for the business decision, as well as links to the business objectives, business tactics and requirements that are linked to the business decision.

After the business decision is drawn, the user can begin to build the complete decision model. In accordance with the present invention, the primary structure of the decision model is the rule family.

In accordance with the present invention, the rule family is a two dimensional structure with a heading (e.g., column labels) and a body (e.g., rows). The cells formed by the intersection of the column and rows are populated with assertions that conform to the column heading where one, and only one, column represents a conclusion that follows from the other columns that represent the conditions that must evaluate to "true" for the corresponding conclusion to be true (i.e., the condition assertions must be ANDed, and not ORed, to lead to the conclusion.) Each row in the body is a complete business logic statement, i.e., a business rule for the purpose of the decision model.

In accordance with the present invention, a rule family conforms to thirteen decision model principles which address three important qualities: structural simplicity, technology independence, and minimal logic anomalies. These decision model principles are as follows:

1. The Tabular Principle. The fundamental structure of the decision model is the rule family and has two dimensions, one dimension is referred to herein as the "heading" and the other dimension is referred to herein as the "body". This principle places rigor on the shape of the decision model's basic structural element. It is the first of several that define the table structure of the rule family, and establishes the two dimensions of the rule family structure.

2. The Heading Principle. The heading of a rule family is a set of fact types. This principle places rigor on the heading of a rule family. A fact type is simply the general classification of a fact (or piece of information), not the piece of information itself. For example, the statement that "Person Named John Doe has Five Years at his Current Employer" is a fact. In this example, the general classification or fact type is "Person's Years at Current Employer". This principle continues the definition of the rule family and sets the standard for column headers of the two dimensional structure.

3. The Body Principle (First Normal Form). The body of a rule family is a set of translated atomic business logic statements conforming to the heading. This principle places rigor on the body of a rule family. Each instance in a rule family (i.e., each row) represents the translation of one business logic statement. Each label in heading, in combination with the body for that label, is a logical expression about the fact type. Taken together, a heading label plus the body for that label form a phrase of the form: fact type+operator+operand. The expressions in the body of a rule family must conform to the constraints for the fact type. Each fact type in a rule family either plays the role of condition or conclusion. When tests of the same fact type in different columns are similar, the test should be combined into one column. This principle establishes that there will be a unique logical expression in each and every row of the rule family, which is the Decision Model First Normal Form. (The normal form (NF) of relational database theory provides criteria for determining a table's degree of vulnerability to logical inconsistencies and anomalies. The higher the normal form applicable to a table, the less vulnerable it is to inconsistencies and anomalies. Similarly, the Decision Model theory provides criteria for the table's degree of vulnerability to logical inconsistencies and anomalies. As will be seen, there are three levels of Decision Model Normal Form, this being the first level.)

4. The Inferential Dependency Principle. The populated cells playing the role of conditions lead to the corresponding populated cells playing the roll of a conclusion based on business-specified inference. This principle places rigor on the correlation of condition fact types to conclusion fact types within a rule family. It is this principle that delivers true business logic in a rule family, and that insures that each row is a single, atomic business rule.

5. The Single Conclusion Principle. A rule family has only one conclusion fact type. This principle places rigor on the conclusion fact type of a rule family and ensures that each rule family contains all the business rules that reach a conclusion for a given fact type. This is one of the elements of a decision model in accordance with the present invention that ensures a durable decision model structure.

6. The Relevant Conditions Principle. All condition cells in a Rule Pattern (where a Rule Pattern is defined as all the populated cells within a row; multiple rows having the same cells populated are said to belong to the same Rule Pattern; it is standard practice to number each unique Rule Pattern as an identifier) must be true for the conclusion cells to be true. This principle places rigor on condition fact types. This principle eliminates illogical use of columns in the rule family by ensuring that all the conditions of each business rule are "ANDed" and that no "Ors" are allowed. This is the Decision Model Second Normal Form.

7. The Inferential Relationship Principle. A rule family has an inferential relationship with another rule family when the conclusion fact type of the latter serves as a condition fact type of the former. This principle integrates the results of principles 1-6 into one cohesive model. It establishes the dependencies between rule families that enable the rule families to be logically grouped into a single business decision such that there are no missing rules for that business decision.

8. Declarative Header Principle. The fact types in the heading of a Rule Family are unordered. This principle removes unnecessary procedural constraints from the heading of a Rule Family. In the rule family, the order of the columns in the representation is unimportant. (Despite this principle, the illustration of the table view of the rule family is illustrated with the conclusion column as the last column. This is a convention for simplicity in representation, whereas, in accordance with this principle, the columns are unordered.)

9. Declarative Body Principle. The entries in the body of a rule family are unordered. This principle addresses the declarative nature of the body of a rule family. In the rule family the business rules may be entered into the table in no particular sequence, or, simply, there is no implied row sequence.

10. Declarative Inferential Integrity Principle. There is no implied sequence in the path among Rule Families related through inferential relationships. It does not matter which business rule in which rule family is first executed. In fact, the structure is declarative, and therefore all the business rules are assumed to execute.

11. Rule Pattern Transitive Conditions Principle. There are no inferential dependencies within a Rule Pattern condition key. (The content of the cells of a Rule Pattern in a given row is said to be the Rule Pattern condition key.) This principle removes redundancies among Rule Pattern conditions, and establishes that there is no subset of a Rule Pattern condition key that leads to or determines another subset of its condition key. This is the Decision Model Third Normal Form.

12. Rule Family and Rule Pattern Consistency Principle. A Rule Family should be free of inconsistencies within each Rule Pattern and among Rule Patterns. This principle addresses completeness of relationships among rule families and removes inconsistencies within a Rule Pattern and among overlapping Rule Patterns. When there are dependent rule families, then every unique conclusion that is found in the conclusion of a rule family must be present in the corresponding condition column of its dependent rule family.

13. Inferential Integrity Principle. There are no inferential dependencies among inferentially related Rule Families. This principle removes redundancies among Rule Families in much the same way that Principle 11 removes redundancies among Rule Pattern conditions. That is, Principle 11 and Principle 13 both resolve transitive inferential dependencies. There may not be overlaps in different values within a given condition column. For example, consider the following business rules. Conditions: age 10-30 and state NC, Conclusion: discount=10%. Conditions: age 15-20 and state NC, Conclusion: discount=20%. It is clearly seen that the age criteria in these two rule overlap, and that both values cannot be true.

Thus, a rule family structure in accordance with the present invention is a table which has rows of business rules, and columns which are the headings of the conditions of the business rules, and one heading of which is a conclusion of the business rules. A rule family in accordance with the present invention is thus a set of business rules that reach a conclusion around a single fact type, and there can be no other business rules in the entire domain that reach a conclusion around this fact that do not belong to this rule family.

An exemplary rule family 100 in accordance with the present invention is illustrated in FIG. 9. This exemplary rule family is shown as it may be displayed in tabular form on an output device 36 of a system 30 in accordance with the present invention. (Note that the explanatory material included in FIG. 9 would not be displayed by the system 30.) The name of this exemplary rule family 100 is "Policy Tier Within Bounds". In this particular exemplary rule family 100 there are two different styles of column headings. One of the column headings 102 is not underlined, which signifies that the values or terms in the column are known, and may be found in some form of persistent data or through direct data entry. The underlined column 104 signifies that the values or terms in that column are not known, but are dependent on values or terms to be found in the conclusion column of another rule family. Such a state indicates a "dependency" of the rule family upon another rule family. Any or all of the condition columns of a rule family could exhibit this characteristic. For each additional column that does, there is a separate dependency, and therefore yet another rule family upon which there is a dependency.

Figure 10:
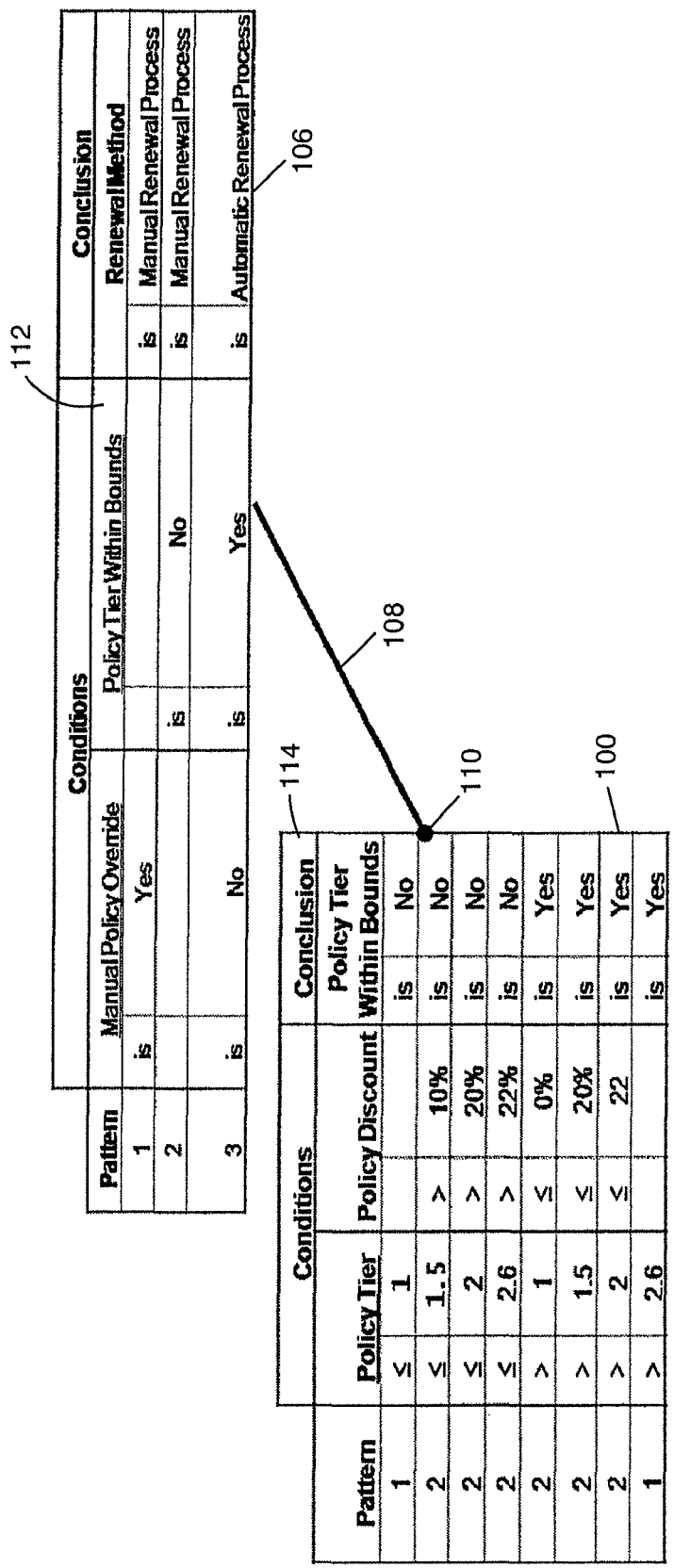
FIG. 10 illustrates an example of rule family dependency in accordance with the present invention.

An example of rule family dependency is illustrated in FIG. 10. In this example, the rule family 106 called "Renewal Method" is dependent upon the rule family 100 "Policy Tier Within Bounds". The dependency is represented by the dependency line 108 that joins the rule families 100 and 106, with a dot 110 at one end of the dependency line 108 indicating the rule family 100 that is being depended upon. It can be seen that the dependency exists because the condition column 112 "Policy Tier Within Bounds" of the rule family 106 obtains the column values or terms from the conclusion column 114 in the rule family 100 "Policy Tier Within Bounds". The rule family that makes the determination for a specific business decision is called a "Decision Rule Family" and so by definition there are no rule families that are dependent upon it. It can also be seen in FIG. 10 that the column 116 "Manual Policy Override" of rule family 106 is dependent upon another rule family. (That dependency is not shown in FIG. 10.)

The utility of the use of rule families in accordance with the present invention is that it permits large groups of business rules to be logically sorted into smaller, more manageable sets than a single, undifferentiated group of all the business rules that go to make up a business decision. Through the rule family dependencies a network of all the business rules that apply to the business decision may be built. Because a rule family structure in accordance with the present invention complies with the decision model principles discussed above, it is known that each business rule can only ever belong in a single rule family. Furthermore, the rule family may be reused in other decisions. It can be seen that, in accordance with the present invention, the business rules grouped in a rule family are not arbitrarily grouped by a decision of an analyst. Rather, they are grouped by the logic construct of their common conclusion fact type. This results in a stable structure, and one that logically connects to the rest of the decision model structure, as will be seen.

Even though a system and method in accordance with the present invention uses the tabular rule family structure described to segment the business rules in a business decision, a tabular representation of the business rules in even single rule family is not always practical. This is particularly the case when it is desirable to view all the rule families of an entire business decision. A very great deal of display space would be occupied by all of the dependent rule family tables in a single business decision, making a depiction of the whole in this form impractical. In accordance with the present invention, this problem preferably is solved by the use of specific symbols and notation to represent rule families and dependencies. The symbols display sufficient information about the rule family to understand and validate the structure without viewing all the business rules. A system and method in accordance with the present invention may preferably allow a user to build the decision model of the symbols, and then generate automatically from the rule model the rule family tables for the purpose of creating the detailed business rules. A system and method in accordance with the present invention may also preferably generate automatically the symbols from the rule families in order to create a graphical model for analysis purposes.

A system and method in accordance with the present invention thus preferably allows a user to view and create a decision model in multiple presentation formats or "views", i.e., a table view and a model view. The system and method of the present invention uses the decision model to perfect the structure and integrity of the business rules and a system of notation and diagrams to give the user control and access at the level of detail required at any point in the business rule harvesting, formulation or managing of the business rules.

A detailed description of the use of a system and method in accordance with the present invention to create a decision model using the symbols for rule families and dependencies in a model view format will now be presented, along with an illustration of the rule families represented by that model in their corresponding table view format.

Typically, a user of a system and method in accordance with the present invention will start building rule families 120 in model view. Model view provides a very quick way to create a broad outline of what the user believes will be the approximate rule families and dependencies for a given business decision. The model does not have to be (and probably cannot be) entirely accurate at the start of the building process. The model will become more and more accurate over time as the rule families are populated in table view.

A rule family preferably is represented in the model view on a graphical user interface by a characteristic shape. For the discussion which follows, a rule family is represented as a tombstone shape for exemplary purposes, although any other desired appropriate size, shape and color may be used. In accordance with the present invention, the model displays sufficient detail of information such that a user can fully understand the underlying structure without seeing the business rules. It is also sufficient to enable the system to automatically create a two dimensional rule family structure in a table view capable of being populated by business rules. A system in accordance with the present invention preferably provides a graphical user interface that allows a user to create a rule family by dragging, using the input device 34, an icon of the rule family symbol into a business rule diagram space of the graphical user interface. A representation of the decision rule family (a rule family that is immediately connected to a business decision is called a "decision rule family") is preferably automatically joined to a representation of the business decision by an arrow in the business rule diagram space display.

Figure 11:
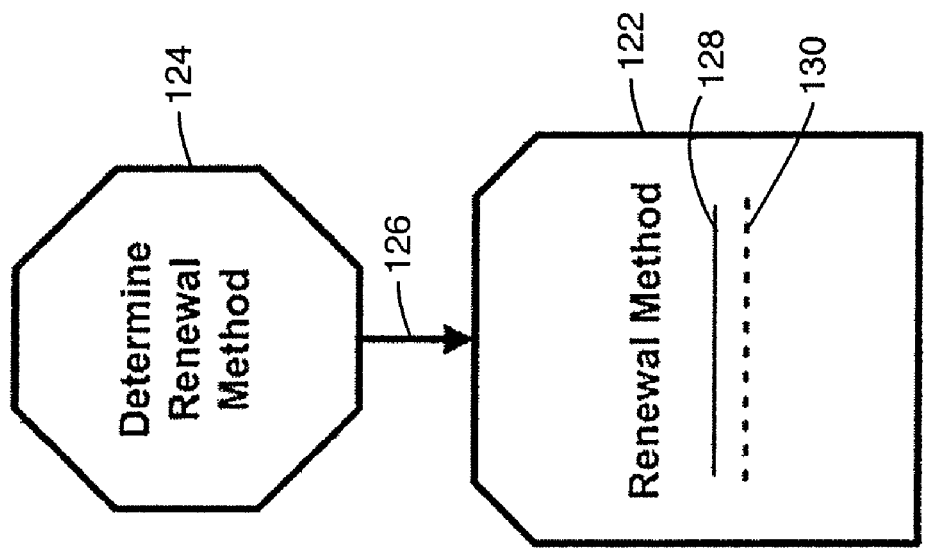
FIGS. 11 and 12 are exemplary graphical user interface displays illustrating the creation of a decision rule family in model view in a system in accordance with the present invention.

In the exemplary graphical user interface display illustrated in FIG. 11 a decision rule family 122 "Renewal Method" has been created in this manner. The rule family symbol 122 is connected to its business decision 124 "Determine Renewal Method" by the arrow 126.

When first created, a rule family is blank, except for its name, which is the name of its conclusion fact type. With reference to the example presented in FIG. 11, at this point a user can know from the model display that there are going to be a number of business rules that determine the method of renewal of a policy. The user can then make some assumptions as to the conditions that will be needed to reach such a conclusion. The fact types relating to these conditions will be named and listed below the solid line 128 in the rule family symbol 122. Each fact type about which conditions will be determined will have a single entry below the solid line 128.

For example, the user may determine that one of the conditions which determine renewal method (i.e., a condition fact type for renewal method) is whether the policy has been flagged with a manual policy override. In this case, an obvious entry below the line 128 in the rule family symbol 122 would be "Manual Policy Override". The user may also determine that the other condition that determines renewal method is whether the "policy tier" level (a policy value that establishes risk/return ratio on the policy) is within a certain range. In this case, the next entry below the line 128 is "Policy Tier Within Bounds". Both of these entries are below the solid line 128 but above the dotted line 130 in the rule family symbol. This is because the values of the condition fact types for these entries are dependent upon other rule families for their value. Condition values that are not dependent in this manner, e.g., values that are available from a table in a database, or direct data entry, are listed below the dotted line 130.

Figure 12:
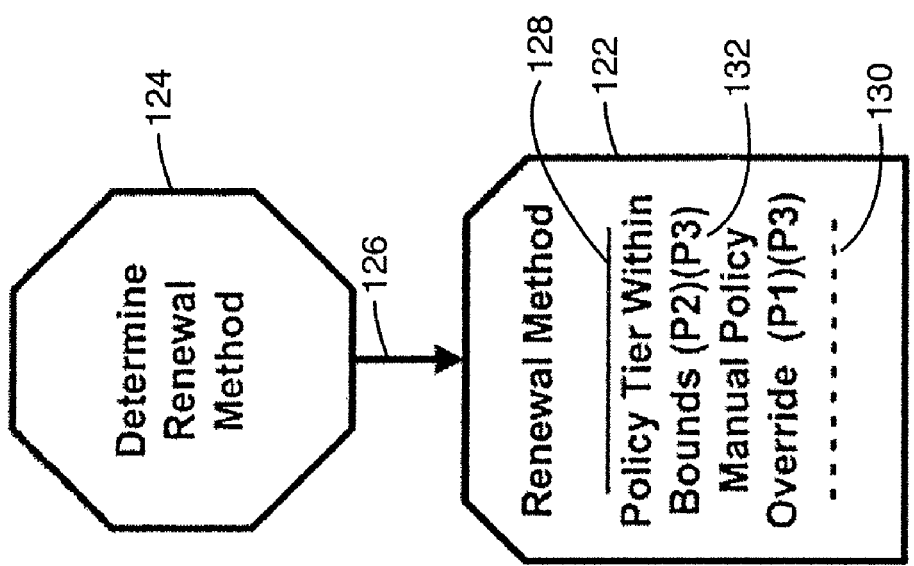

An exemplary graphical user interface display of the resulting rule family 122 at this point is presented in FIG. 12. Note the pattern numbers (P) 132 for each of the condition fact types. These pattern numbers 132 indicate that a rule family is comprised of more than one rule pattern of business rules, where a rule pattern is, by definition, a set of condition and conclusion fact types within a rule family where all of its condition fact type expressions are required to reach the corresponding conclusion fact type value. For example, if condition 1 and condition 2 are required to reach the conclusion, all business rules that test these conditions belong to the same rule pattern. On the other hand, if condition 1 and condition 3 and condition 4 are required to reach the conclusion, all business rules that test these conditions belong to a different rule pattern. These two rule patterns can be in the same rule family if their conclusion is the same fact type. The patterns may not be known at the outset, when the condition facts are first identified, they may only become final when the rule families become fully populated. The user need not necessarily be concerned at this stage of building the rule families with the population of the business rules into the structure. That can occur at a later stage. Preferably the user will complete the structure so that he will know the specifics about the business rules that need formulation, rule family by rule family.

Returning to the example being described, now that the structure of the "Renewal Method" rule family 122 is complete, it is clear that to complete the decision model for the decision 124 "Determine Renewal Method", the rule families for the two dependent columns "Policy Tier Within Bounds" and "Manual Policy Override" need to be created. A system in accordance with the present invention preferably provides, as part of the graphical user interface, functionality allowing a user to select, using an input device 34, a rule family, in response to which property pages for the rule family will be opened. These property pages will include and allow entry and editing of all the metadata for the rule family selected.

Using a preferred system in accordance with the present invention, the process of adding the next and subsequent groups of rule families is straight forward. For each dependent column in a rule family, a rule family of the same name may be created in the manner just discussed. In the example being discussed, two new rule families are created, one with an indication that the conclusion fact type for the rule family is "Policy Tier Within Bounds", the other with an indication that the conclusion fact type for the rule family is "Manual Override". Because both of these column headings were placed above the dotted line 130 in the rule family symbol 122, the system in accordance with the present invention preferably recognizes the need for the creation of the new rule families and automatically prompts a user for the creation of these two new rule families. The user's task is to determine what are the condition fact types that will likely lead to the conclusion fact for each new rule family.

Figure 13:
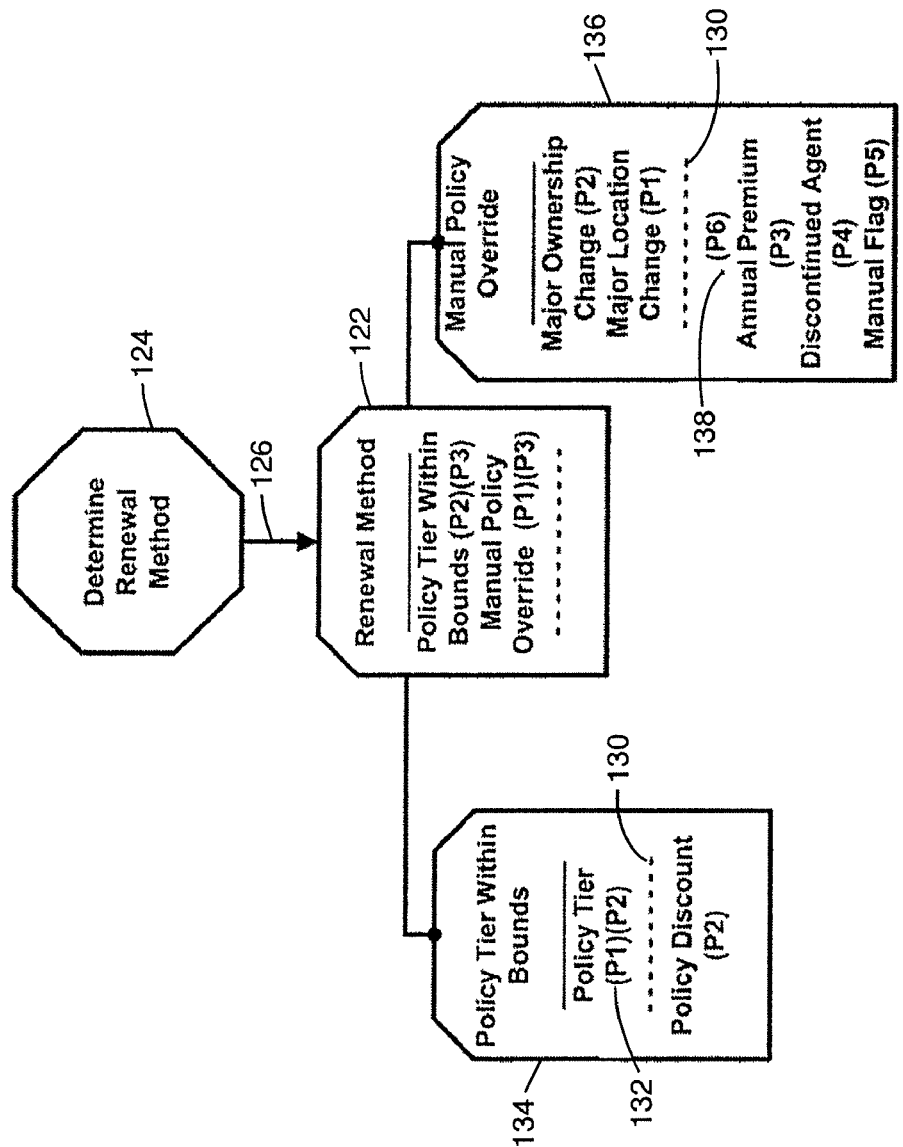
FIGS. 13 and 14 are exemplary graphical user interface displays illustrating the creation of additional rule families upon which the first order rule family of FIGS. 11 and 12 depends.

An exemplary graphical user interface display illustrating the completion, in the manner just described, of both new rule families "Policy Tier Within Bounds" 134 and "Manual Policy Override" 136 is presented in FIG. 13. In both cases the new rule families 134 and 136 display condition fact types (listed below the dotted line 130) the values (or terms) of which are derived from persistent data or direct data entry. In one case 138 the fact or column header is listed as ".". This denotes that one of the rule patterns does not have any conditions at all, and consists only of the conclusion column or fact type. This means that in the absence of any values in the condition column there is a default value for the conclusion column. Both of the new rule families 134 and 136 that have been added are themselves dependent rule families, as they both include condition columns listed above the dotted lines 130. This means that the decision model is not complete and that additional rule families need to be added. Again, the model illustrated also includes pattern numbers 132 for each of the columns. In practice the patterns probably will not be known until a few, or in some cases all, of the business rules have been populated in the rule family structures. The user may take a guess at this point, but the system in accordance with the present invention preferably automatically updates and completes this as the user enters actual business rules into the rule family tables (as will be described in more detail below). Also, at this point the user will have only hypothecated on the probable condition columns for each of the rule families. The user may add some conditions, or remove others, as the business rules are written. Conditions preferably may be added or removed by the system in accordance with the present invention as the user makes changes in the business rules (as will be described in more detail below).

Figure 14:
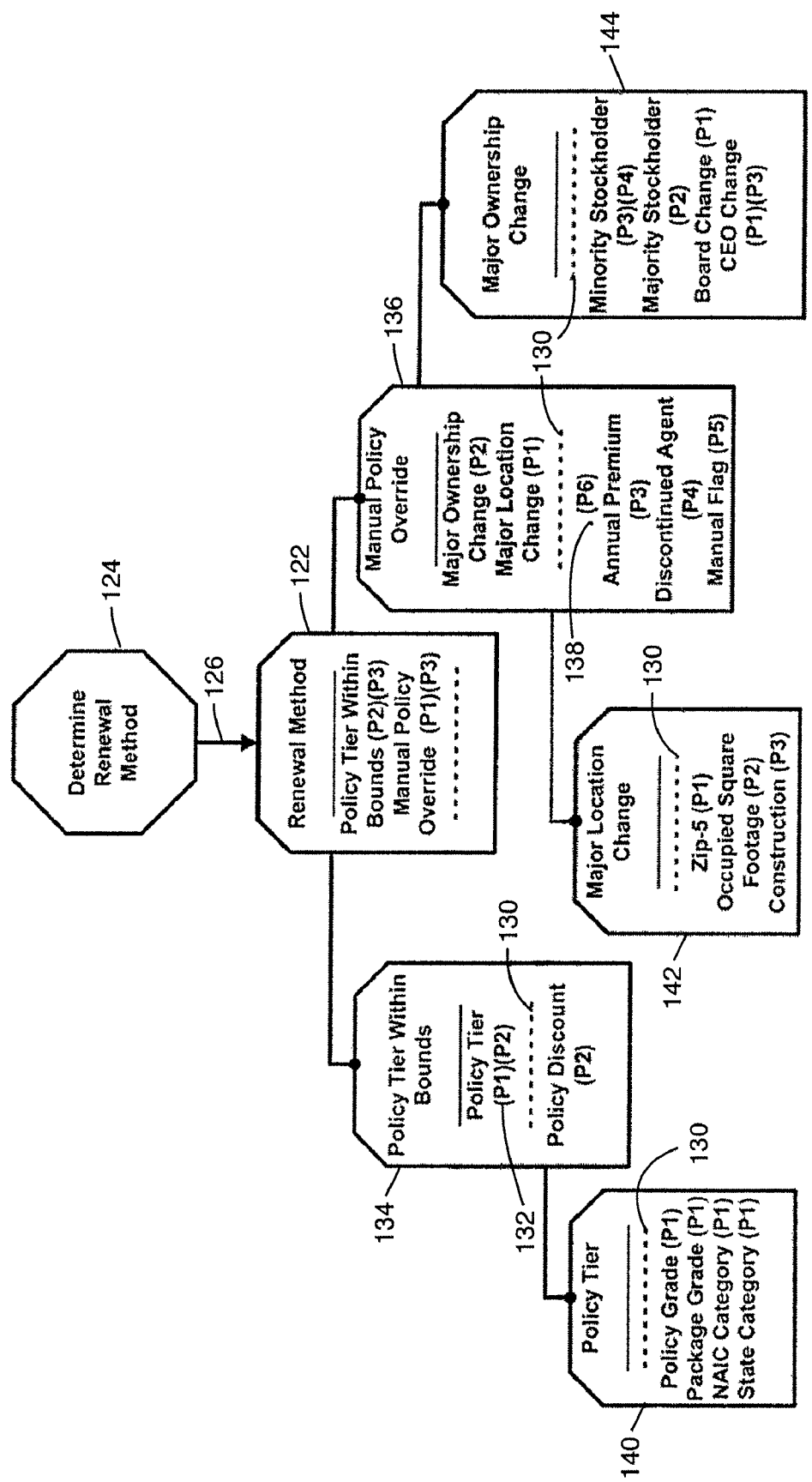

An exemplary graphical user interface display showing the addition of rule families that complete the dependencies for the condition columns illustrated in FIG. 13 is presented in FIG. 14. In this case, for all the new rule families 140, 142, and 144 that have been added, all the condition columns are below the dotted line 130. This signifies that all of the new condition columns have values or terms that are known (i.e., are derived from available sources such as persistent data stores), and therefore there are no further rule families to be added. This indicates that the decision model structure is complete, at least provisionally, until all of the business rules have been fully populated, analyzed and tested. At this point the user has created a decision model skeletal structure that may now be used to populate with business rules.

In practice, a user could start to populate each or any of the rule families at any point during the creation of the rule families. This may be done in order to determine the correctness of the condition columns, or even to help understand which conditions will be necessary for a given rule family.

Figure 15:
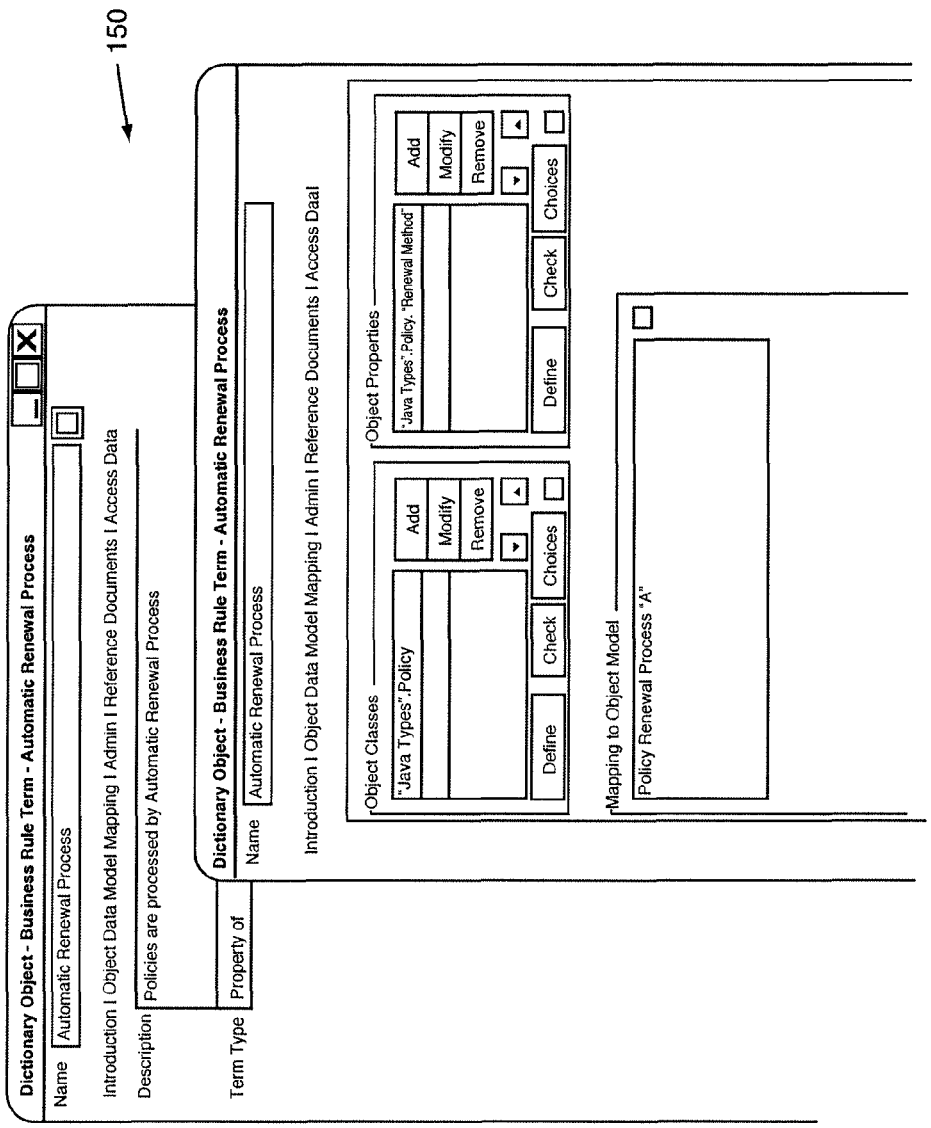
FIG. 15 is a screen shot illustrating an exemplary user interface for specifying metadata components of condition and conclusion fact terms that are maintained in a glossary in a system in accordance with the present invention.

It is important, in framing business rules, to ensure semantic accuracy of the business rules. A decision model in accordance with the present invention enforces this accuracy, because in accordance with the present invention the business rules are built of their component pieces through the model. In accordance with the present invention, the condition and conclusion fact types that are added to the model preferably are automatically entered into a glossary, that is a dictionary of all the fact types and fact values contained in the model. A system in accordance with the present invention preferably also provides an appropriate user interface whereby a user is able to maintain the contents of the glossary. An exemplary user interface 150 that may be provided by a system in accordance with the present invention to provide such functionality is illustrated in FIG. 15. By selecting a glossary term added, e.g., using a system input device 14, the user interface 150 is displayed, whereby the user may further specify metadata components of the glossary term. When dependent rule families are added during the building process 120, a system in accordance with the present invention preferably automatically uses the terms in the glossary to ensure that the correct fact types or values are used.

When the rule families are populated with business rules, i.e., when the table view rows are populated, each time a table cell is completed the user may re-use an existing fact type or value in the glossary, or failing that is required to note whether the cell contains a fact type or value. Where a fact type is created, the user is required to provide the definition of the fact type to ensure it is available for future re-use.

In this fashion the glossary for the decision base is created somewhat automatically as the model is built and populated. During the period of population, the fact types, values, and their definitions may evolve and become better qualified: changes to the glossary automatically update the decision base and the impact of the changes can be examined by the user before they are completed.

An important aspect of the glossary metadata is that the fact types and values in the glossary can be mapped in the system of the present invention either to all of the business object model, the data model or the fact model being maintained for technical purposes. (These models are different representations used in the business systems to represent and abstract the real entities such as "Customer", "Inventory Item", "Named Insurance Policy", and the like.)

Figure 16:
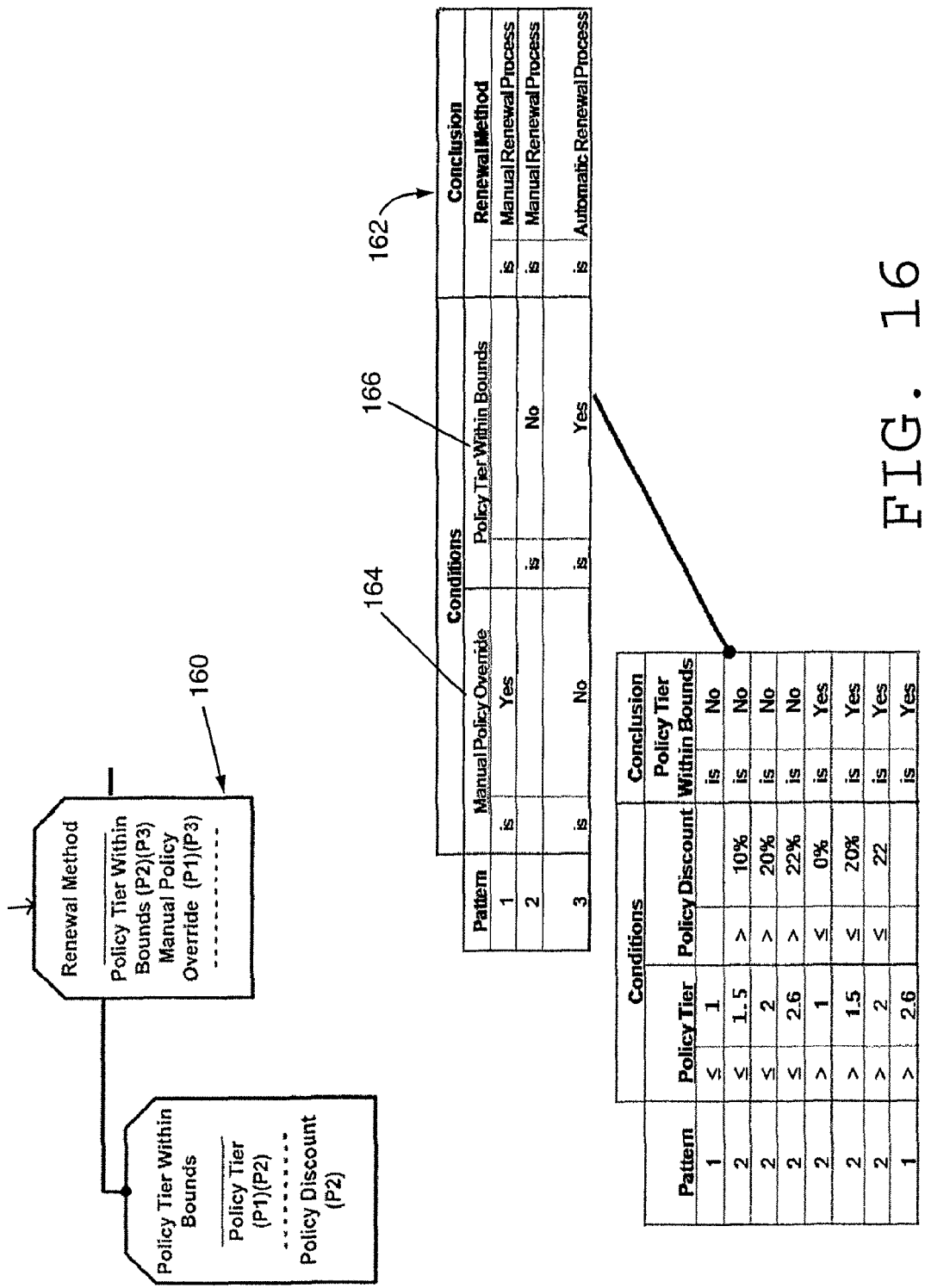
FIG. 16 illustrates corresponding exemplary decision model and table views of the same rule family in a system and method in accordance with the present invention.

To populate the rule families in the decision model 58, the user switches the view of the decision model from the model view to the table view. The system user interface preferably allows a user to select a rule family that is to be populated, e.g., using an input 14 pointing device, and then to select from available view choices to show the rule family in table view. For example, corresponding exemplary decision model 160 and table 162 views of rule family "Renewal Method" are illustrated in FIG. 16. The arrows illustrate diagrammatically the correlation between the labels in the model view and the column headings. FIG. 16 is an illustration of the model view 160 and the table view 162 of the two rule families where the table view 162 is fully populated with business rules, and showing the dependency between the two rule families. Before populating the table 162 the rows will be blank. Because the user has indicated in the model view 160 that there are three patterns (P1-P3), the table view 162 preferably may be instantiated automatically by the system with three rows. (The default may be a single row.)

The table view 162 also shows that this rule family is dependent upon two other rule families, "Manual Policy Override" 164 and "Policy Tier Within Bounds" 166, because these two column headings are underlined. Preferably the user interface may provide for either or both of these dependencies to be opened by the user by employing the input device 14 to select a column header and an option to "Open Dependency". Other user options may be provided by the user interface upon selecting a column, including, preferably, the opening of a properties page to add or review detailed properties of the fact defined in the column header.

Figure 17:
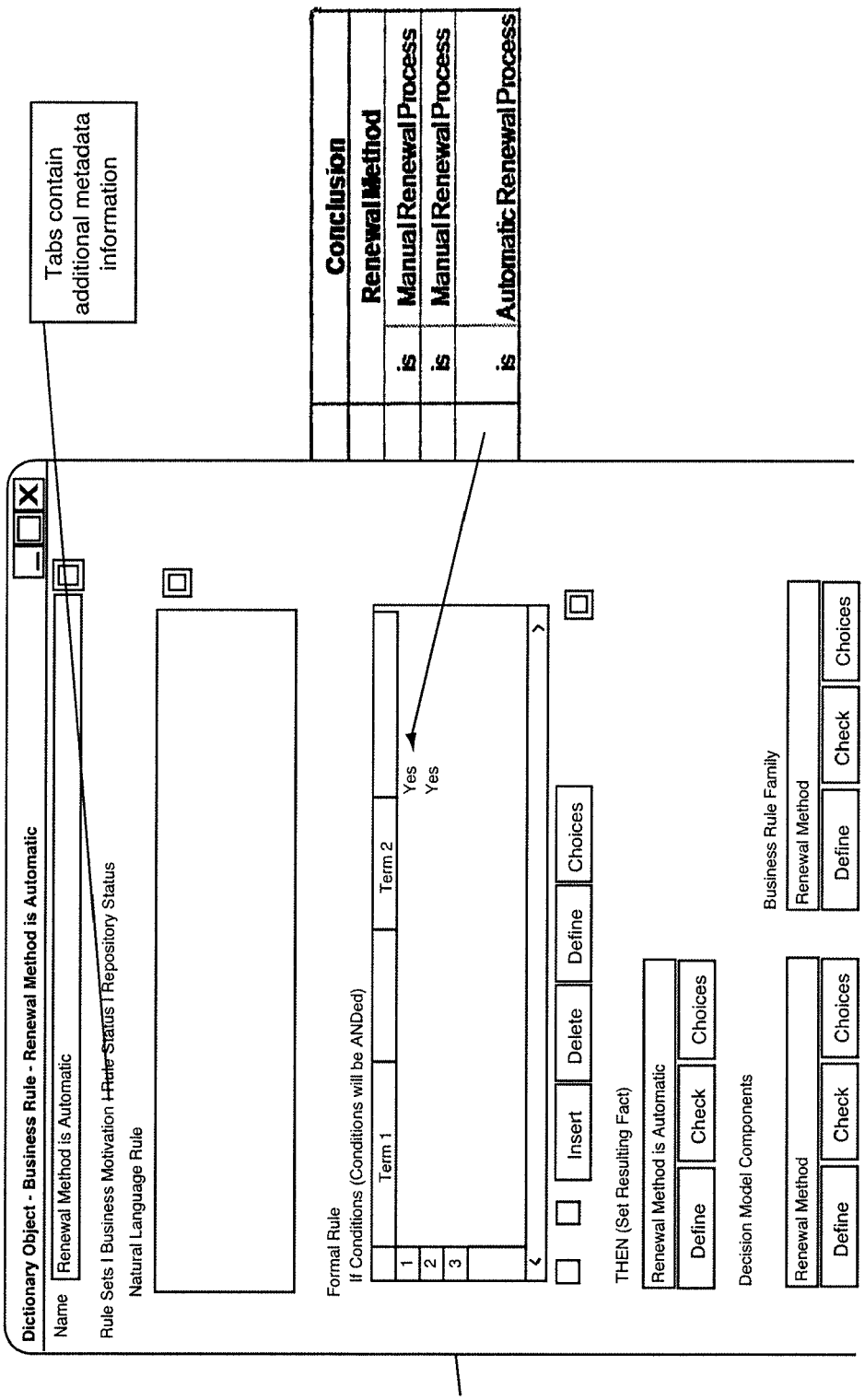
FIG. 17 shows an exemplary user interface in a system in accordance with the present invention for editing properties of a business rule.

During population of the decision rules 58, or at any time after that, any of the business rules that populate the rows of the rule family table may be formalized 60 into a business rule expression. The user interface preferably provides for the user to select any row in a displayed family rule table, e.g., using an input pointing device 34, and to select from at least one available option to open a properties page user interface for that row. This provides a formal presentation of the business rule, and the opportunity for a natural language expression of that business rule to be formulated. Additional metadata information preferably may be added to the business rule by employing this user interface. An exemplary user interface 170 providing such functionality is illustrated in FIG. 17.

Once a decision base is fully populated, the business rules preferably are analyzed 62 to ensure that they fully comply with the principles of the decision model. This will ensure that they have inferential integrity and comply with the business purpose for which they were authored. Inferential integrity is a property that allows a large system to be studied in smaller pieces, and have the inferences derived from the analysis of individual components hold when the system is considered in its entirety. This integrity is enforced by the enforcement of the decision model principles discussed above.

A system in accordance with the present invention preferably provides continuous automatic checking of the business rules against the decision model principles. During the process of building the rule base this integrity test may not be invoked, because it is known that the business rules are not complete. As the decision base approaches completion, the integrity tests are continually reviewed to understand what rule families appear not to be complete.

Figure 18:
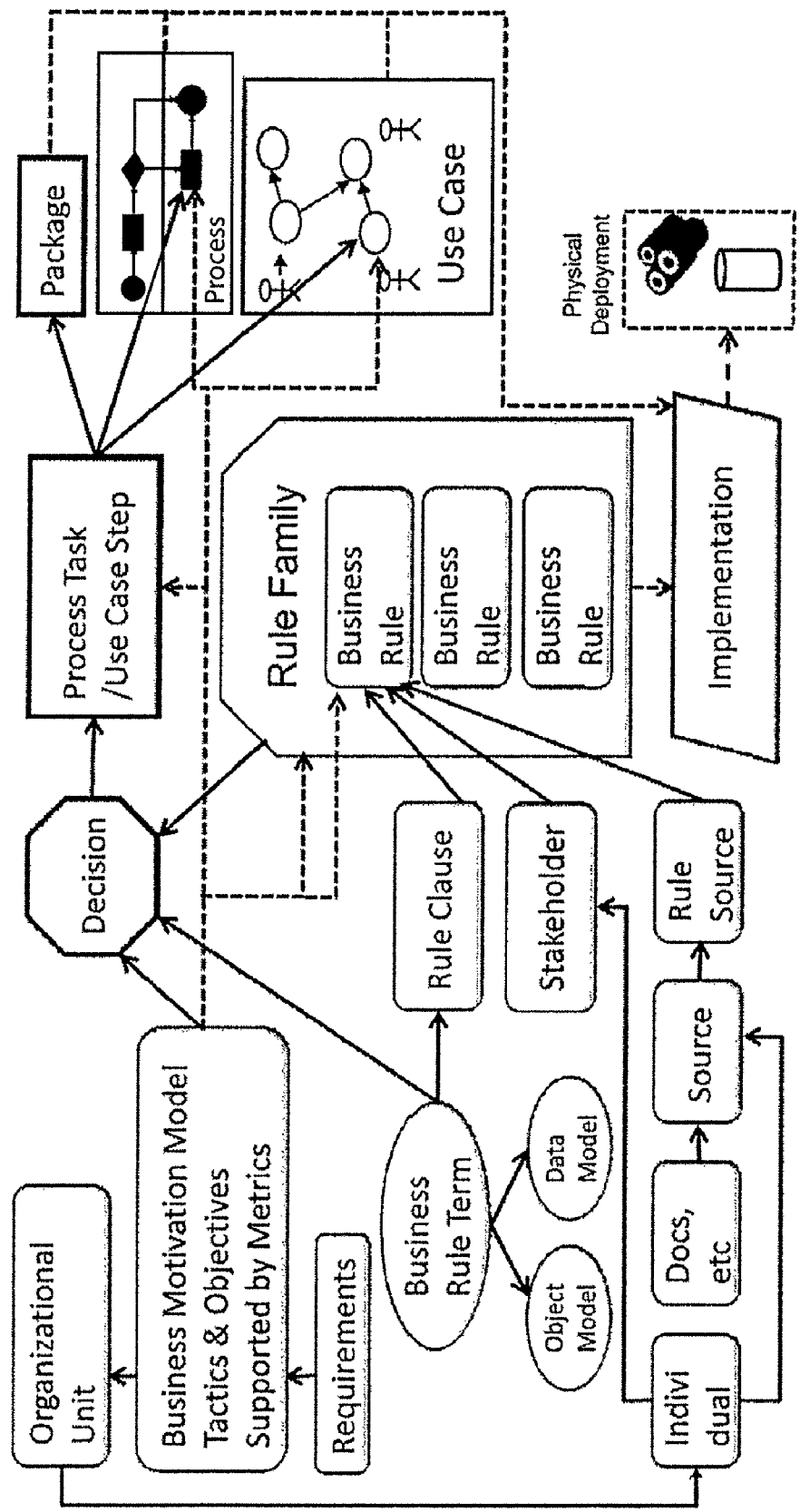
FIG. 18 shows an exemplary graphical user interface in a system in accordance with the present invention for tracing business objectives to business decisions to rule families to business rules.
Figure 19:
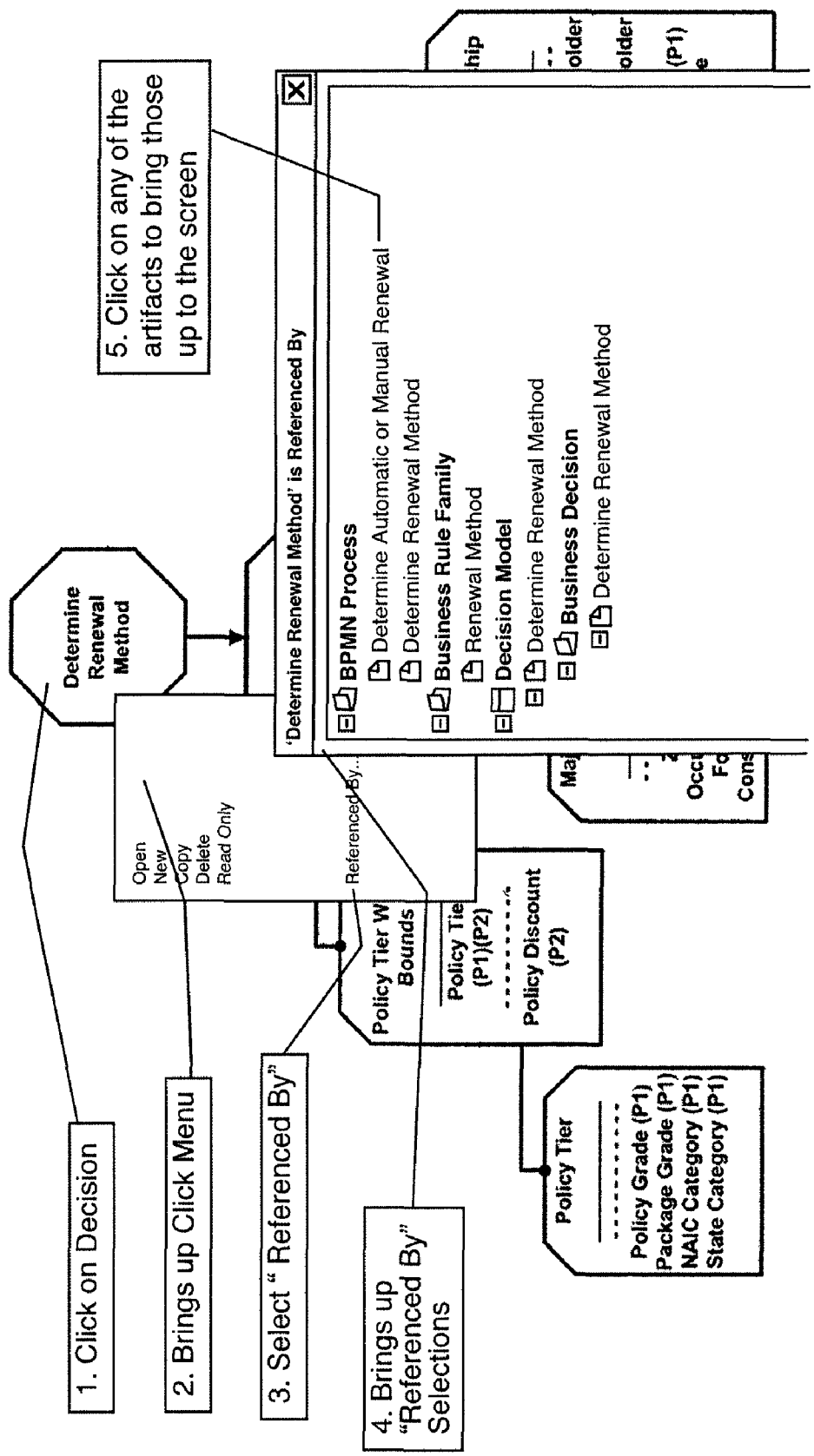
FIG. 19 shows an exemplary use of the exemplary graphical user interface of FIG. 18.

Additionally, the business rules should be inspected by the authors to test whether they comply with the business objectives of the business decision, and that the metrics defined to track business success will provide the necessary information to the business to enable the business rules to be adjusted to improve results. Much of this inspection is aided by a preferred functionality provided by a system in accordance with the present invention that allows a user to easily trace the business objectives to the business decisions, rule families and business rules themselves. An exemplary graphical user interface 180 that may be provided by a system in accordance with the present invention showing the connection of artifacts is illustrated in FIG. 18. Tracing from one object to any other in the chain or traceability may be accomplished by selecting, e.g., using an input device 14, any object in the decision base to display an options menu. The options menu preferably provides at least the options of "Trace To" and "Referenced By". By selecting one of these options a list of all the items that can be traced to or from the selected item is displayed. By selecting an item from displayed list that item will be opened in the desk top. This process is illustrated in FIG. 19.

A further method of analysis of the business rules and other artifacts of the decision model may be provided as reporting facilities or functionalities by a system in accordance with the present invention. This preferably allows an unlimited number of ad hoc queries to be run against the decision base, or even across many decision bases.

It is understood that the invention is not confined to the particular construction and arrangement of parts herein illustrated and described, but embraces such modified forms thereof as come within the scope of the following claims.

What is claimed is:

1. A computer implemented decision modeling system for modeling business decisions made according to business rules, the system including a memory of a computer having stored therein a plurality of inputted rule families, wherein:
   a. each rule family is defined by:
      i. a heading representing a first dimension of the rule family; and
      ii. a body representing a second dimension of the rule family, the body having populatable cells corresponding to the heading;
   b. the heading of at least one rule family includes:
      i. one or more condition fact types corresponding to satisfiable conditions that lead to conclusions; and
      ii. only one conclusion fact type corresponding to conclusions dependent on whether conditions are satisfied;
   c. the body of each rule family includes one or more logic statements, at least one logic statement having:
      i. a condition cell corresponding with each condition fact type in the heading,
         1) each condition cell populated with a satisfiable condition,
         2) the condition fact type being true only if the satisfiable condition populating the corresponding condition cell is satisfied; and
      ii. a conclusion cell corresponding with the one conclusion fact type in the heading,
         1) the conclusion cell populated with a conclusion dependent on whether the satisfiable conditions populating the condition cells in the logic statement are satisfied, 2) the conclusion fact type being true only if all corresponding condition fact types in the logic statement are true; and d. the conclusion fact type of one or more of the plurality of rule families serves as a condition fact type of at least one other of the plurality of rule families to form an inferential relationship.

2. The system of claim 1 wherein the plurality of rule families are characterized by all of the characteristics from the group of rule family characteristics consisting of:

a. the fact types in the headings of the plurality of rule families are unordered;
b. entries in the bodies of the plurality of rule families are unordered;
c. there is no implied sequence among rule families having an inferential relationship;
d. there are no inferential dependencies within a rule pattern;
e. each rule family is free of inconsistencies within each rule pattern and among rule patterns; and
f. there are no inferential dependencies among inferentially related rule families.

3. The system of claim 1 wherein the plurality of rule families are rule families and wherein the specified inferences forming rule patterns are specified business inferences.

4. The system of claim 1 comprising additionally:
a. an input device;
b. an output device; and
c. a computer system coupled to the input device, to the output device, and to the memory and adapted to retrieve the plurality of rule families from memory, to display the retrieved rule families in graphical and tabular form on the display device, to receive changes to the rule families in graphical and textual form from a user via the input device, and to store changed rule families back in memory.

5. The system of claim 4 wherein the computer system is adapted to provide a warning to a user if received changes to the rule families do not comply with the conditions (a) through (g) of claim 1.

6. The system of claim 4 wherein the computer system is adapted to display in model form on the output device the inferential relationship of rule families.

7. The system of claim 6 wherein the rule families are displayed in a graphical symbol with:
a. conclusion fact type at the top of the graphical symbol;
b. condition fact types having inferential relationships with other rule families in their own section of the graphical symbol;
c. condition fact types having no inferential relationships with other rule families in their own section of the graphical symbol; and
d. a connecting line from a rule family to other rule families with which it has an inferential relationship.

8. The system of claim 1 wherein each logic statement includes a rule pattern indicating which of the condition fact types are checked to determine whether the conclusion fact type is true.

9. The system of claim 1 wherein each logic statement is atomic such that the logic statements cannot be further decomposed.

10. The system of claim 1 wherein each populated condition cell in each logic statement includes an operator and an operand, with the operator operable on the operand to determine whether the satisfiable condition in the populated condition cell is satisfied.

11. The system of claim 10 wherein the conclusion cell in each logic statement includes an operator and an operand, with the operator operable on the operand to indicate the conclusion.

12. The system of claim 1 wherein the logic statements of a rule family can result in more than one conclusion fact type value which is true for each set of satisfiable conditions.

13. The system of claim 12 wherein each rule family is unique such that no two rule families have the same conclusion fact type.

14. The system of claim 1 further including an output device, wherein the rule families are depicted in tabular form on the output device with the heading and body corresponding to columns and rows.

15. The system of claim 14 wherein the rule families are displayed in a table with:
a. condition fact types and the one conclusion fact type as headings;
b. the operators and operands used to test satisfiable conditions as cells populating the logical statements of the body.

16. The system of claim 1 wherein the rule families:
a. represent all the business rules used to make business decisions across all business functions; and
b. are maintained in one place in the system separate from other business functions, such that revisions to the rule families in one place affects all other business functions in other places.

17. A computer implemented modeling system for modeling business decisions made according to business rules, the system including:
a. a computer having a memory, the memory storing one or more two-dimensional rule families input into the computer; and
b. a first rule family stored in the memory, the first rule family having:
  i. a heading dimension including:
    1) one or more condition fact types, at least one of the condition fact types being occupied; and
    2) only one conclusion fact type, the conclusion fact type being either true or false; and
  ii. a body dimension configured to form one or more logic statements in which the conclusion fact type depends on the condition fact types according to a rule pattern,
    1) each logic statement:
      a) having an operand and an operator corresponding to each occupied condition fact type,
      b) the operator being operable on the operand to make the occupied condition fact type either true or false,
    2) the rule pattern indicating which condition fact types are tested to determine whether the conclusion fact type is true or false, wherein every tested condition fact type must be true for the conclusion fact type to be true in each logic statement.

18. The system of claim 17 wherein the logic statements in the first rule family can result in more than one conclusion fact type value for a given set of conditions.

19. The system of claim 18 further including a second rule family stored in the memory, wherein the conclusion fact type of the first rule family is a condition fact type of the second rule family.

20. The system of claim 19 wherein the rule families are displayed in a graphical symbol with:
   a. conclusion fact type at the top of the graphical symbol;
   b. condition fact types having inferential relationships with other rule families in their own section of the graphical symbol;
   c. condition fact types having no inferential relationships with other rule families in their own section of the graphical symbol; and
   d. a connecting line from a rule family to other rule families with which it has an inferential relationship.

21. The system of claim 19 further including an output device connected to the computer, wherein each rule family is presented in a graphical symbol with a list of its conclusion fact type, condition fact types, conclusion fact type differentiated from condition fact types, condition fact types having inferential relationships with other rule families differentiated from condition fact types not having inferential relationships with other rule families, and relationship connections among rule families having inferential relationships with each other.

22. The system of claim 19 further including an output device connected to the computer, wherein each rule family is presented in a two-dimensional table, with the heading dimension represented by table columns and the body dimension represented by table rows.

23. A computer implemented decision modeling method for modeling business decisions made according to business rules, the computer having an input device and an output device, the method including the steps of:
   a. inputting a plurality of rule families into the computer using the input device, wherein:
     i. each rule family is defined by:
       1) a heading representing a first dimension of the rule family; and
       2) a body representing a second dimension of the rule family, the body having populatable cells corresponding to the heading;
     ii. the heading of each rule family includes:
       1) one or more condition fact types corresponding to satisfiable conditions that lead to conclusions; and
       2) only one conclusion fact type corresponding to conclusions dependent on whether conditions are satisfied;
     iii. the body of each rule family includes one or more logic statements, at least one logic statement having:
       1) a condition cell corresponding with each condition fact type in the heading,
         a) each condition cell populated with a satisfiable condition,
         b) the condition fact type being true only if the satisfiable condition populating the corresponding condition cell is satisfied; and
       2) a conclusion cell corresponding with the one conclusion fact type in the heading,
         a) the conclusion cell populated with a conclusion dependent on whether the satisfiable conditions populating the condition cells in the logic statement are satisfied,
         b) the conclusion fact type being true only if all corresponding condition fact types in the logic statement are true; and
     iv. the conclusion fact type of at least one of the plurality of rule families serves as a condition fact type of at least one other of the plurality of rule families to form an inferential relationship; and
   b. displaying the rule families in tabular or model form using the output device.

24. The method of claim 23, wherein when the rule families are displayed in tabular form:
   a. the heading and the body correspond to columns and rows;
   b. the heading in the table includes the condition fact types and the one conclusion fact type; and
   c. the body in the table includes logic statements populating cells corresponding to the condition and conclusion fact types of the heading.

25. The method of claim 23, wherein when the rule families are displayed in model form, the model form shows a structure of the inferentially-related rule families and their conclusion and condition fact types.

* * * * *